United States Patent
Venugopal et al.

(10) Patent No.: US 12,501,303 B2
(45) Date of Patent: Dec. 16, 2025

(54) TIME DOMAIN PHASE TRACKING FOR COHERENT JOINT COMMUNICATIONS WITH MULTIPLE TRANSMISSION-RECEPTION POINTS

(71) Applicant: QUALCOMM Incorporated, San Diego, CA (US)

(72) Inventors: Kiran Venugopal, Green Brook, NJ (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/189,796

(22) Filed: Mar. 24, 2023

(65) Prior Publication Data
US 2024/0323732 A1 Sep. 26, 2024

(51) Int. Cl.
H04W 24/10 (2009.01)
H04W 8/22 (2009.01)

(52) U.S. Cl.
CPC ............ *H04W 24/10* (2013.01); *H04W 8/22* (2013.01)

(58) Field of Classification Search
CPC ...... H04W 24/10; H04W 8/22; H04B 7/0469; H04B 7/0623; H04B 7/063; H04B 7/024
See application file for complete search history.

(56) References Cited

U.S. PATENT DOCUMENTS

| | | | | |
|---|---|---|---|---|
| 2012/0275507 A1* | 11/2012 | Roman | ................. | H04B 17/21 455/422.1 |
| 2015/0195071 A1* | 7/2015 | Lunttila | ............ | H04L 25/03904 370/329 |
| 2023/0088818 A1* | 3/2023 | Chou | .................. | H04B 7/0469 370/329 |
| 2023/0291454 A1* | 9/2023 | Chou | ...................... | H04B 7/10 |
| 2024/0097848 A1* | 3/2024 | Gao | ..................... | H04L 5/0035 |
| 2025/0080176 A1* | 3/2025 | Zhang | ................... | H04B 7/024 |

(Continued)

OTHER PUBLICATIONS

Interdigital Inc: "CSI Enhancements for CJT and High Doppler Operations", 3GPP TSG RAN WG1 #110, R1-2205818, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 11 Pages, XP052273748, The Whole Document.

(Continued)

*Primary Examiner* — Steven Hieu D Nguyen
(74) *Attorney, Agent, or Firm* — Holland & Hart LLP

(57) ABSTRACT

Methods, systems, and devices for wireless communications are described that provide for a user equipment (UE) to report higher order phase variation information to a network entity for the purpose of coherent joint transmission (CJT) with two or more transmission reception points (TRPs). The UE may provide an indication to the network entity that the UE is able to report higher order phase variation information, and a measurement report may be provided that includes such higher order phase variation information. The network entity may select a precoding matrix for CJT with the UE via the two or more TRPs based on the measurement report. The network entity may then communicate with the UE via the TRPs in accordance with the selected precoding matrix.

26 Claims, 20 Drawing Sheets

(56) References Cited

U.S. PATENT DOCUMENTS

2025/0151010 A1\* 5/2025 Hoang .................. H04L 5/0051

OTHER PUBLICATIONS

International Search Report and Written Opinion—PCT/US2024/016697—ISA/EPO—Jun. 25, 2024.

Nokia, et al., "CSI Enhancement for High/Medium UE Velocities and CJT", 3GPP TSG RAN WG1 Meeting #109-e, R1-2204540, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 30 Pages, XP052153577, The Whole Document.

Xiaomi: "Discussion on CSI Enhancement for High/Medium UE Velocities and CJT", 3GPP TSG RAN WG1 #110 bis-e, R1-2209258, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, 15 Pages, XP052277176, The Whole Document.

\* cited by examiner

TIME DOMAIN PHASE TRACKING FOR COHERENT JOINT COMMUNICATIONS WITH MULTIPLE TRANSMISSION-RECEPTION POINTS

FIELD OF TECHNOLOGY

The following relates to wireless communications, including time domain phase tracking for coherent joint communications with multiple transmission-reception points.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a network entity (e.g., a base station) may communicate with UE using one or more transmission-reception points (TRPs). Further, the UE and the network entity may implement coherent joint transmission (CJT). CJT may allow the UE to receive signaling from two or more TRPs using the same frequency and time resources.

SUMMARY

The described techniques relate to improved methods, systems, devices, and apparatuses that support time domain phase tracking for coherent joint communications with multiple transmission-reception points. For example, the described techniques provide for a user equipment (UE) to report higher order phase variation information to a network entity for the purpose of coherent joint transmission (CJT) with two or more transmission reception points (TRPs). In some examples, the UE may provide an indication to the network entity that the UE is able to report higher order phase variation information, such as in a capability indication, with a measurement report, or both. A measurement report may be provided that includes such higher order phase variation information associated with the two or more TRPs, such as in indication of a time domain phase variation, Doppler domain phase variation, or any combinations thereof. The network entity may select a precoding matrix for CJT with the UE via the two or more TRPs based on the measurement report. The network entity may then communicate with the UE via the TRPs. Additionally, or alternatively, the UE may report a precoding codebook for each TRP that indicates time variation per link (e.g., for non-co-located TRPs), or may report a common precoding codebook for multiple TRPs that indicates time variation that is common across the multiple TRPs (e.g., for co-located TRPs).

A method for wireless communication at a user equipment (UE) is described. The method may include receiving configuration information for coherent joint communications with two or more transmission-reception points, the configuration information including an indication that time-varying co-phasing information associated with changes in relative phase information between the two or more transmission-reception points is to be reported by the UE and transmitting a measurement report that includes the time-varying co-phasing information based on a time-domain variation of measured phase information associated with each of the two or more transmission-reception points.

An apparatus for wireless communication at a UE is described. The apparatus may include a processor, memory coupled with the processor, and instructions stored in the memory. The instructions may be executable by the processor to cause the apparatus to receive configuration information for coherent joint communications with two or more transmission-reception points, the configuration information including an indication that time-varying co-phasing information associated with changes in relative phase information between the two or more transmission-reception points is to be reported by the UE and transmit a measurement report that includes the time-varying co-phasing information based on a time-domain variation of measured phase information associated with each of the two or more transmission-reception points.

Another apparatus for wireless communication at a UE is described. The apparatus may include means for receiving configuration information for coherent joint communications with two or more transmission-reception points, the configuration information including an indication that time-varying co-phasing information associated with changes in relative phase information between the two or more transmission-reception points is to be reported by the UE and means for transmitting a measurement report that includes the time-varying co-phasing information based on a time-domain variation of measured phase information associated with each of the two or more transmission-reception points.

A non-transitory computer-readable medium storing code for wireless communication at a UE is described. The code may include instructions executable by a processor to receive configuration information for coherent joint communications with two or more transmission-reception points, the configuration information including an indication that time-varying co-phasing information associated with changes in relative phase information between the two or more transmission-reception points is to be reported by the UE and transmit a measurement report that includes the time-varying co-phasing information based on a time-domain variation of measured phase information associated with each of the two or more transmission-reception points.

Some examples of the method, apparatuses, and non-transitory computer-readable medium described herein may further include operations, features, means, or instructions for transmitting an indication that the time-varying co-phasing information for the two or more transmission-reception points can be reported by the UE. In some examples of the method, apparatuses, and non-transitory computer-readable medium described herein, the indication that the time-varying co-phasing information for the two or more transmission-reception points can be reported by the UE may be provided in a capability indication transmitted by the UE. In some examples of the method, apparatuses, and non-transitory computer-readable medium described herein, the indication that the time-varying co-phasing information for the two or more transmission-reception points can be reported by the UE may be provided in an initial measurement report associated with the two or more transmission-reception points. In some examples of the method, apparatuses, and non-transitory computer-readable medium described herein, the indication that the time-varying co-phasing information for the two or more transmission-reception points can be reported by the UE may be provided based on an identification of a time variation of co-phasing angles associated with the two or more transmission-reception points that exceeds a threshold value.

Some examples of the method, apparatuses, and non-transitory computer-readable medium described herein may further include operations, features, means, or instructions for receiving a request to transmit the measurement report that includes the time-varying co-phasing information, and where the measurement report is transmitted responsive to the request. In some examples of the method, apparatuses, and non-transitory computer-readable medium described herein, the request to transmit the measurement report that includes the time-varying co-phasing information is provided responsive to a loss of phase coherence of the coherent joint communications with the two or more transmission-reception points.

In some examples of the method, apparatuses, and non-transitory computer-readable medium described herein, the time-varying co-phasing information includes separate indications of the time-domain variation of measured phase information for each of the two or more transmission-reception points, or includes a common indication of the time-domain variation of measured phase information that applies to each of the two or more transmission-reception points.

In some examples of the method, apparatuses, and non-transitory computer-readable medium described herein, the time-varying co-phasing information includes a first order variation in a co-phasing angle associated with at least a first transmission-reception point of the two or more transmission-reception points, and where a co-phasing angle for the first transmission-reception point for a first slot is based on a phase angle associated with the first transmission-reception point at a reference slot, the first order variation in the co-phasing angle associated with the first transmission-reception point, and a time difference between the first slot and the reference slot.

In some examples of the method, apparatuses, and non-transitory computer-readable medium described herein, the time-varying co-phasing information may be valid for a time period associated with the coherent joint communications with the two or more transmission-reception points. Some examples of the method, apparatuses, and non-transitory computer-readable medium described herein may further include operations, features, means, or instructions for transmitting a precoding codebook for each of the two or more transmission-reception points that indicates the time-varying co-phasing information associated with each of the two or more transmission-reception points. Some examples of the method, apparatuses, and non-transitory computer-readable medium described herein may further include operations, features, means, or instructions for transmitting a precoding codebook that indicates common time-varying co-phasing information that are common across each transmission-reception point of the two or more transmission-reception points.

A method for wireless communication at an access network entity is described. The method may include transmitting configuration information for coherent joint communications between a UE and two or more transmission-reception points, the configuration information including an indication that time-varying co-phasing information associated with changes in relative phase information between the two or more transmission-reception points is to be reported by the UE, receiving a measurement report that includes the time-varying co-phasing information based on a time-domain variation of phase information measured at the UE for each of the two or more transmission-reception points, and selecting a precoding matrix for the coherent joint communications based on the measurement report.

An apparatus for wireless communication at an access network entity is described. The apparatus may include a processor, memory coupled with the processor, and instructions stored in the memory. The instructions may be executable by the processor to cause the apparatus to transmit configuration information for coherent joint communications between a UE and two or more transmission-reception points, the configuration information including an indication that time-varying co-phasing information associated with changes in relative phase information between the two or more transmission-reception points is to be reported by the UE, receive a measurement report that includes the time-varying co-phasing information based on a time-domain variation of phase information measured at the UE for each of the two or more transmission-reception points, and select a precoding matrix for the coherent joint communications based on the measurement report.

Another apparatus for wireless communication at an access network entity is described. The apparatus may include means for transmitting configuration information for coherent joint communications between a UE and two or more transmission-reception points, the configuration information including an indication that time-varying co-phasing information associated with changes in relative phase information between the two or more transmission-reception points is to be reported by the UE, means for receiving a measurement report that includes the time-varying co-phasing information based on a time-domain variation of phase information measured at the UE for each of the two or more transmission-reception points, and means for selecting a precoding matrix for the coherent joint communications based on the measurement report.

A non-transitory computer-readable medium storing code for wireless communication at an access network entity is described. The code may include instructions executable by a processor to transmit configuration information for coherent joint communications between a UE and two or more transmission-reception points, the configuration information including an indication that time-varying co-phasing information associated with changes in relative phase information between the two or more transmission-reception points is to be reported by the UE, receive a measurement report that includes the time-varying co-phasing information based on a time-domain variation of phase information measured at the UE for each of the two or more transmission-reception points, and select a precoding matrix for the coherent joint communications based on the measurement report.

Some examples of the method, apparatuses, and non-transitory computer-readable medium described herein may further include operations, features, means, or instructions for receiving an indication that the time-varying co-phasing information for the two or more transmission-reception points can be reported by the UE. In some examples of the method, apparatuses, and non-transitory computer-readable medium described herein, the indication that the time-varying co-phasing information for the two or more transmission-reception points can be reported by the UE may be provided in a capability indication transmitted by the UE. In some examples of the method, apparatuses, and non-transitory computer-readable medium described herein, the indication that the time-varying co-phasing information for the two or more transmission-reception points can be reported by the UE may be provided in an initial measurement report associated with the two or more transmission-reception points. In some examples of the method, apparatuses, and non-transitory computer-readable medium described herein, the indication that the time-varying co-phasing information for the two or more transmission-reception points can be reported by the UE may be provided based on an identification of a time variation of co-phasing angles associated with the two or more transmission-reception points that exceeds a threshold value.

Some examples of the method, apparatuses, and non-transitory computer-readable medium described herein may further include operations, features, means, or instructions for transmitting, to the UE, a request to transmit the measurement report that includes the time-varying co-phasing information, and where the measurement report is responsive to the request. In some examples of the method, apparatuses, and non-transitory computer-readable medium described herein, the request to transmit the measurement report that includes the time-varying co-phasing information is provided responsive to a loss of phase coherence of the coherent joint communications with the two or more transmission-reception points.

In some examples of the method, apparatuses, and non-transitory computer-readable medium described herein, the time-varying co-phasing information includes separate indications of the time-domain variation of measured phase information for each of the two or more transmission-reception points, or includes a common indication of the time-domain variation of measured phase information that applies to each of the two or more transmission-reception points.

In some examples of the method, apparatuses, and non-transitory computer-readable medium described herein, the time-varying co-phasing information includes a first order variation in a co-phasing angle associated with at least a first transmission-reception point of the two or more transmission-reception points, and where a co-phasing angle for the first transmission-reception point for a first slot is based on a phase angle associated with the first transmission-reception point at a reference slot, the first order variation in the co-phasing angle associated with the first transmission-reception point, and a time difference between the first slot and the reference slot. In some examples of the method, apparatuses, and non-transitory computer-readable medium described herein, the time-varying co-phasing information may be valid for a time period associated with the coherent joint communications between the UE and the two or more transmission-reception points.

Some examples of the method, apparatuses, and non-transitory computer-readable medium described herein may further include operations, features, means, or instructions for receiving, from the UE, a precoding codebook for each of the two or more transmission-reception points that indicates the time-varying co-phasing information associated with each of the two or more transmission-reception points. Some examples of the method, apparatuses, and non-transitory computer-readable medium described herein may further include operations, features, means, or instructions for receiving, from the UE, a precoding codebook that indicates common time-varying co-phasing information that are common across each transmission-reception point of the two or more transmission-reception points.

DETAILED DESCRIPTION

Figure 1:
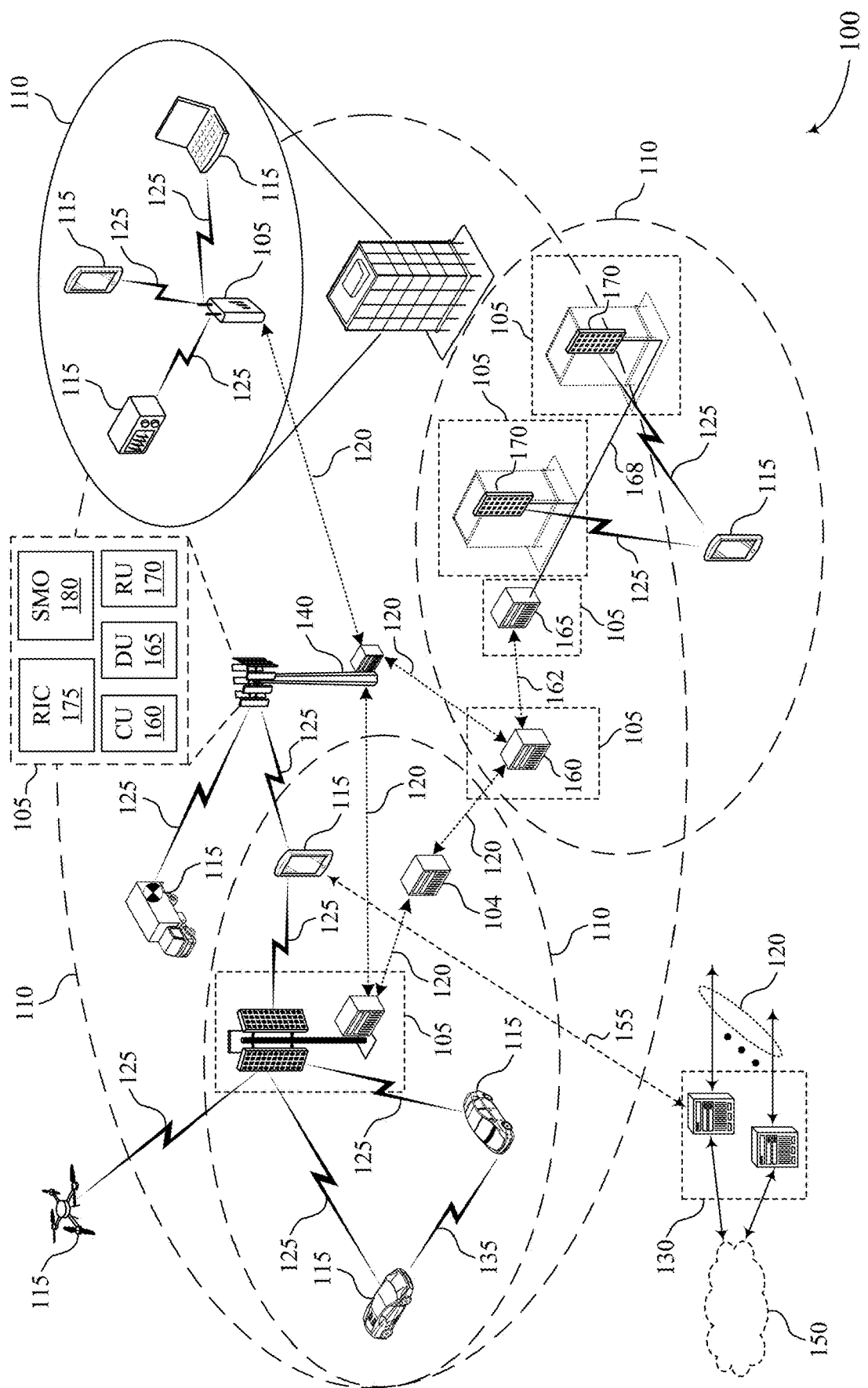
FIG. 1 shows an example of a wireless communications system that supports time domain phase tracking for coherent joint communications with multiple transmission-reception points (TRPs) in accordance with one or more aspects of the present disclosure.

In some examples, a user equipment (UE) may communicate with a network entity (e.g., a base station) using two or more transmission-reception points (TRPs). Moreover, the UE may support coherent joint transmission (CJT). During CJT, the UE may receive signaling from two or more TRPs (e.g., a TRP group) concurrently (e.g., over the same time and frequency resources). To enable CJT, the UE may report precoding matrix information (e.g., a spatial domain basis matrix, a frequency domain basis matrix, and a spatial-frequency coefficient matrix) for the corresponding TRP group. However, if phase coherency is lost for the TRPs, one or more CJTs may fail. For example, coherency may be lost in cases where the UE changes position, and the effective propagation delays and distance from the respective TRPs changes. Further, in some cases a time offset between a reference signal transmission (e.g., a channel state information (CSI) reference signal burst) used for CJT measurement and reporting and an actual CJT communication (e.g. a physical downlink shared channel (PDSCH) transmission) based on the CJT measurement report may be relatively long, and phase coherency may be lost during the time offset. Additionally, phase coherency may be lost if one or more of the participating TRPs have switched modes (e.g., transmit/receive modes, or multiple-input multiple-output (MIMO) modes). Thus, efficient techniques to indicate time-varying phase information for multi-TRP CJT communications may help to enhance communications efficiency and reliability.

In accordance with various techniques discussed herein, a UE may report time-domain (TD) or Doppler-domain (DD) time-varying phase information for multi-TRP communications. Such TD/DD time-varying phase information may increase a time duration that information associated with a measurement report for CJT can reliably be used to determine a precoding matrix for CJT. In some aspects, the time-varying phase information may use less signaling overhead than transmission of one or more extended Type-II precoding matrix indicator (PMI) codebooks, and thus may help reduce UE power consumption and processing resources, and may reduce instances where phase coherency is lost or a TRP changes MIMO modes between a CSI report and a CJT communication. In some cases, a UE may provide a capability indication of a capability to report time-varying phase information, which may be referred to as higher order phase information, for multi-TRP co-phasing.

In some cases, in response to a request from a network entity, the UE may provide the higher order phase information for multi-TRP co-phasing. In accordance with some aspects, the request from the network entity (e.g., a gNB associated with the two or more TRPs) may be based on the capability indication, or may be triggered by a loss of phase coherence across CJT TRPs. In some cases, the higher order phase information may be TRP-specific or common to a group of TRPs. In some cases, using the higher order phase information, a co-phasing angle for a TRP at a first slot may be a function of a phase angle for the TRP at a reference slot, the time-varying phase variation information, and a time difference between the first slot and the reference slot. Additionally, in some cases, the higher order phase information may be valid for a time period associated with the multi-TRP communications. Additionally, or alternatively, the UE may report a precoding codebook for each TRP that indicates time variation per link (e.g., for non-co-located TRPs), or may report a common precoding codebook for multiple TRPs that indicates time variation that is common across the multiple TRPs (e.g., for co-located TRPs).

Aspects of the disclosure are initially described in the context of wireless communications systems. Additional aspects are described in the context of a PMI scheme and a process flow. Aspects of the disclosure are further illustrated by and described with reference to apparatus diagrams, system diagrams, and flowcharts that relate to time domain phase tracking for coherent joint communications with multiple TRPs.

FIG. 1 shows an example of a wireless communications system 100 that supports time domain phase tracking for coherent joint communications with multiple TRPs in accordance with one or more aspects of the present disclosure.

The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support time domain phase tracking for coherent joint communications with multiple TRPs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., A base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As described herein, the UE 115 may report higher order phase variation information to a network entity 105 for the purpose of CJT. In some examples, the UE 115-a may provide such information in response to a request from the network entity 105. In accordance with some aspects, the request from the network entity 105 may be based on the capability indication provided by the UE 115, or may be triggered by a loss of phase coherence across CJT TRPs. In some cases, the higher order phase information may be TRP-specific or common to a group of TRPs. In some cases, using the higher order phase information, a co-phasing angle for a TRP at a first slot may be a function of a phase angle for the TRP at a reference slot, the time-varying phase variation information, and a time difference between the first slot and the reference slot. Additionally, in some cases, the higher order phase information may be valid for a time period associated with the multi-TRP communications. Additionally, or alternatively, the UE may report a precoding codebook for each TRP that indicates time variation per link (e.g., for non-co-located TRPs), or may report a common precoding codebook for multiple TRPs that indicates time variation that is common across the multiple TRPs (e.g., for co-located TRPs). The network entity 105 may then communicate with the UE 115 via two or more TRPs using a precoding matrix that is determined based on the higher order phase variation information.

Figure 2:
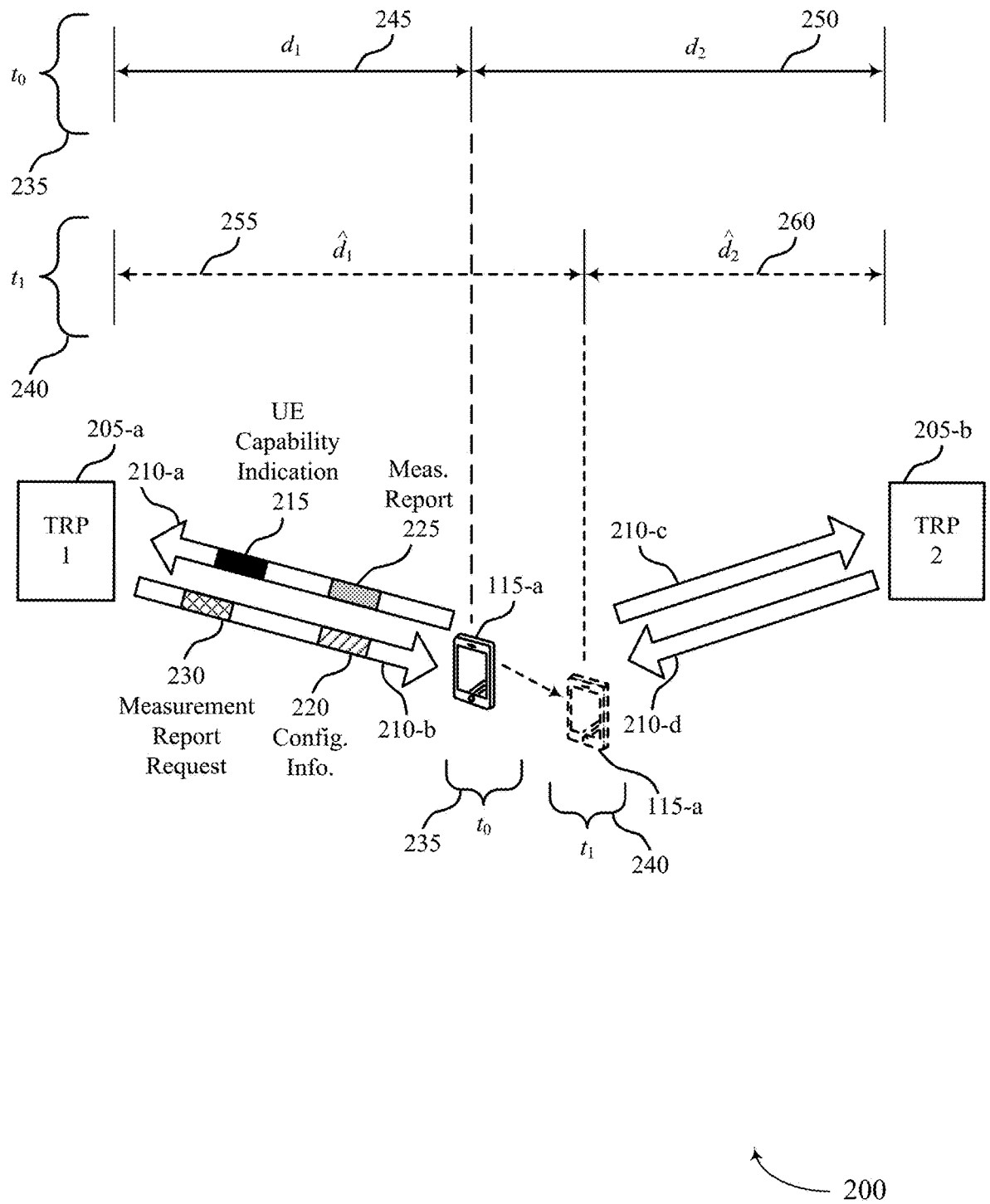
FIG. 2 shows an example of a wireless communications system that supports time domain phase tracking for coherent joint communications with multiple TRPs in accordance with one or more aspects of the present disclosure.

FIG. 2 shows an example of a wireless communications system 200 that supports time domain phase tracking for coherent joint communications with multiple TRPs in accordance with one or more aspects of the present disclosure. In some examples, the wireless communications system 200 may implement aspects of a wireless communications system 100. For example, the wireless communications system 200 may include a first TRP 205-a, a second TRP 205-b, and a UE 115-a which may be examples of corresponding devices as described with reference to FIG. 1.

In some examples, a network entity (e.g., a network entity 105 of FIG. 1) may communicate with UE 115-a using TRPs 205 (e.g., via uplink channel 210-a and downlink channel 210-b with the first TRP 205-a, and via uplink channel 210-c and downlink channel 210-d with second TRP 205-b). For example, the TRPs 205 may act remote antenna for the network entity, and the network entity may schedule the TRPs 205 to transmit signaling to or receive signaling from the UE 115-a. In some cases, using one or more backhaul links, the TRPs 205 may then relay any information obtained from the UE 115-a to the network entity. FIG. 2 illustrates the first TRP 205-a and the second TRP 205-b as examples of distributed TRPs 205 (e.g., TRPs 205 separated by some distance), but it is understood that the methods as described herein may also apply to co-located TRPs 205 (e.g., TRPs 205 in the same location or placed together).

In some examples, the UE 115-a may be configured to receive signaling from at least two TRPs 205 (e.g., and up to four TRPs 205) over the same time and frequency resources. This type of communication may be known as JT. There may be two cases of JT, CJT and non-coherent JT. In the case of CJT, a network entity may have some knowledge about channels between the UE 115-a and the TRPs 205 involved in the JT. Alternatively, in the case non-coherent JT, the network entity may have little to no knowledge of the channel between the UE 115-a and the TRPs 205 involved in the JT. As such, to support CJT, the UE 115-a may provide one or more measurement reports 225 (e.g., CSI reports) associated with the TRPs 205. In some cases, the UE 115-a may provide a capability indication 215 that indicates a capability to provide higher order phase variation information, and the network entity (e.g., via the first TRP 205-a) may provide configuration information 220 that indicates higher order phase variation information is to be provided with measurement report 225. In some cases, the measurement report 225 may be provided responsive to a measurement report request 230.

In accordance with various techniques discussed herein, the UE 115-*a* may determine CSI for each TRP 205 based on measurements of reference signals (e.g., CSI-RSs or synchronization signal block (SSB) signals) received from the TRPs 205. The CSI may include parameters such as one or more of a rank indicator (RI), a PMI, a channel quality indicator (CQI), or a CSI-RS resource indicator (CRI). It is noted that the illustration in FIG. 2 shows signaling of UE capability indication 215, configuration information 220, measurement report 225, and measurement report request 230, between the UE 115-*a* and first TRP 205-*a*, and this illustration is for purposes of discussion and illustration only. Such signaling may be exchanged between one or both TRPs 205, one or more other TRPs, one or more other network entities, or any combinations thereof.

Based on the measurement report 225, a network entity may determine a precoding matrix (e.g., indicated by a PMI) that is to be used for CJT between the TRPs 205 and the UE 115-*a*. The PMI may indicate a selected precoding matrix (W) to use for downlink transmissions, for example. A transmitting device may utilize the selected precoding matrix during precoding. In some examples, precoding may be performed to reduce a peak-to-average-power ratio (PAPR) of a transmitted signal. For example, precoding may allow the transmitting device to exploit transmit diversity by weighing the information stream which may reduce the corrupted effects of a channel. In some examples, the selected precoding matrix is not explicitly signaled, but provided as an index that corresponds to a set of predefined precoding matrices (e.g., codebook). The precoding matrix may be made up of a one or more precoding matrix components. For example, the precoding matrix may be the product of three different matrices, as discussed in more detail with reference to FIG. 3.

As discussed herein, in some cases the UE 115-*a* may move in relation to the TRPs 205. For example, at a first time 235 ($t_0$) the UE 115-*a* may be in a first location, and may move to a second location at a second time 240 ($t_1$). In the example of FIG. 2, at the first time 235 the UE 115-*a* may be located a distance $d_1$ 245 from the first TRP 205-*a* and a distance $d_2$ 250 from the second TRP 205-*b*. Then, at the second time 240, the UE 115-*a* may be located a distance $\hat{d}_1$ 255 from the first TRP 205-*a* and a distance $\hat{d}_2$ 260 from the second TRP 205-*b*. The relative phase between the TRPs 205 at the first time 235 ($t_0$) may be $$\phi_{t_0} = \frac{d_1 - d_2}{\lambda},$$

and the relative phase between the TRPs 205 at the second time 240 ($t_1$) may be $$\phi_{t_1} = \frac{\hat{d}_1 - \hat{d}_2}{\lambda}.$$

In cases where the change in distances between the UE 115-*a* and TRPs 205 is a portion of the wavelength, phase coherency may be lost. For example, at a 30 GHz carrier frequency, a 2.5 mm ($\lambda/4$) position change of the UE 115-*a* corresponds to 180° relative phase change.

In some cases, the changes in the position may be reported by providing information that indicates a time varying component of UE 115-*a* movement (e.g., a time-domain or Doppler-domain change). In some aspects, a precoding matrix may be indicated that provides information related to higher order phase variation information. Additionally, or alternatively, a first order variation in co-phasing information may be reported with a CSI measurement report, which may provide for reduced overhead in comparison with transmission of different precoding matrix information.

Figure 3:
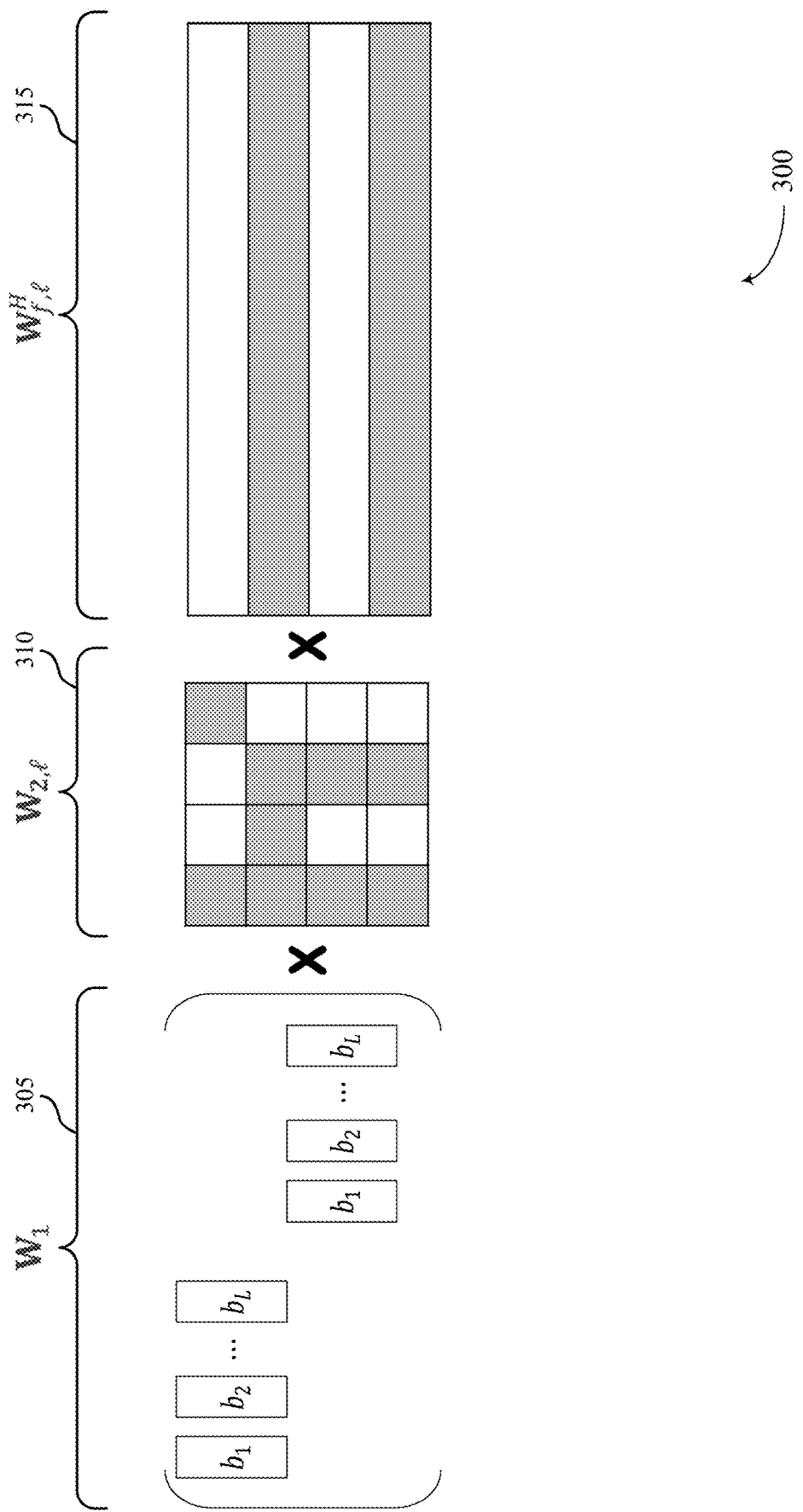
FIG. 3 shows an example of a precoder matrix determination that supports time domain phase tracking for coherent joint communications with multiple TRPs in accordance with one or more aspects of the present disclosure.

FIG. 3 shows an example of a precoder matrix determination 300 that supports time domain phase tracking for coherent joint communications with multiple TRPs in accordance with one or more aspects of the present disclosure. In some examples, the precoder matrix determination 300 may be implemented in aspects of a wireless communications system 100 or 200.

In some cases, a precoding matrix may be the product of three different matrices, including a spatial domain basis matrix 305 ($W_1$), a spatial-frequency domain coefficient matrix 310 ($W_{2,l}$), and a frequency domain basis matrix 315 ($W_{f,l}$). A frequency domain basis may represent a frequency range that results in a strongest reception of the reference signals (e.g., signal strength above a threshold) and the spatial domain basis may reflect layer (e.g., spatial layer) and port combinations that result in a strongest reception of the reference signals (e.g., CSI-RS strength above a threshold). The precoding matrix for a spatial layer may be represented as $W^{(l)} = W_1 W_{2,l} W_{f,l}^H$.

In some cases, a codebook may be used to identify a precoding matrix, having a codebook structure with size $N_t \times N_3$ for a layer, where $N_t$ is the number of transmit antennas, $N_3$ is the number of PMI matrices determined by number of CQI subbands and number of PMI subbands per CQI subband. The spatial domain basis matrix 305 ($W_1$) may provide the spatial domain basis (discrete Fourier transform(DFT)) as $N_t \times 2L$, where L beams are selected for each polarity. This spatial domain basis matrix 305 may be common among all spatial layers. The spatial-frequency domain coefficient matrix 310 ($W_{2,l}$) may be a coefficient matrix of 2L×M, where M is the number of frequency domain basis vectors, and $K_0$ non-zero coefficients indicates a maximum number of non-zero coefficients (total $2K_0$) across layers. This spatial-frequency domain coefficient matrix 310 may be layer specific. The frequency domain basis matrix 315 ($W_{f,l}$) may be layer specific, and may be a M×$N_3$ (DFT) matrix, in which M may be RRC configured and based on rank indicator (RI).

For CJT, multi-TRP codebook refinement may be provided in which multiple TRPs (e.g., up to 4 TRPs) may participate in CJT, and a codebook structure may depend on a mode associated with the frequency domain bases for multi-TRP CJT. In such cases, a first mode may provide a frequency domain independent codebook in which the spatial-frequency domain coefficient matrix 310 ($W_2$) provides independent frequency domain coefficients for different TRPs, and a second mode may provide a joint frequency domain codebook for the different TRPs. Further, in cases with medium or high Doppler UEs the PMI codebook may be extended to time/Doppler domain, to provide a Doppler-domain orthogonal DFT basis that is commonly selected for all SD/FD bases. In such cases, a UE may capture the phase compensation across the TRPs via individual $W_2$ feedback. However, such reporting may substantially increase overhead, as the Doppler-domain orthogonal DFT basis applied to the coefficient matrix results in substantially more coefficients to be reported, which may consume wireless resources and additional power at the UE. Further, in cases where phase coherence is not maintained, additional reporting may be transmitted based on a trigger to perform CSI measurement and reporting in order to obtain phase coherence again. Further, such additional reporting may also increase a latency in CSI reporting due to large processing requirements at the UE. Thus, techniques as discussed herein to indicate time-varying phase information for multi-TRP CJT communications may enhance communications efficiency, reduce overhead, and enhance reliability.

In some aspects, a UE may capture the phase compensation across the TRPs via the individual $W_{2,n}$ feedback as:

$$\begin{bmatrix} e^{j\psi_1} W_{1,1} \tilde{W}_{2,1} W_{f,1}^H \\ \vdots \\ e^{j\psi_N} W_{1,N} \tilde{W}_{2,N} W_{f,N}^H \end{bmatrix}.$$

In such cases, in the event of a potential phase disruption, a network entity may configure CSI measurement and reporting resources/instances. For example, when the channel coherence time is relatively short, the network entity may configure more frequent CSI resources and measurements. As indicated, such additional reporting may consume additional overhead, processing resources, and power. In some aspects, to reduce the CSI overheads in terms of frequency of reporting and measurement for time varying multi-TRP CJT channels, the per-TRP component of the CJT precoder may be extended to capture the time-domain (TD) variation, Doppler-domain (DD) variation, or both, associated with CSI measurements. In some cases, each TRP may have a separate TD/DD basis to capture the time variation per link (e.g. per TRP for non-co-located TRPs), and may be reported using codebook structure:

$$\begin{bmatrix} W_{1,1} \tilde{W}_{2,1} (W_{f,1} \otimes W_{d,1})^H \\ \vdots \\ W_{1,N} \tilde{W}_{2,N} (W_{f,N} \otimes W_{d,N})^H \end{bmatrix}$$

In other cases, the CJT codebook refinement may be extended to have TD/DD basis that is common across the TRPs (e.g., which may be used for co-located TRPs). In each case, the frequency domain basis may be per TRP or common across TRPs depending on a frequency domain basis mode, and the choice for frequency domain basis mode may be dependent on whether TRPs are co-located, or independently configured.

In some aspects, additionally or alternatively, the variation in co-phasing angles across TRPs may be predicable, such as if a UE is moving in a known trajectory (e.g., in accordance with a regular movement pattern of a MTC device). In such cases, the UE may feedback higher order phase variation information to the network entity instead of single set of relative phase information. In some cases, a measurement report may be extended to capture the CJT multi-TRP co-phasing information, such as by providing one or more fields in a measurement report that indicates a TD or DD phase variation. In some cases, a UE may provide an indication to a network entity that it can provide higher order phase information for multi-TRP co-phasing. For example, this may be indicated separately as a UE capability, may be indicated after or with transmission of a measurement report (e.g., based on a presence of reliable higher order phase information, such that the indication may be provided based on specific scenarios), or any combinations thereof.

In some aspects, if the network entity senses a loss of phase coherence across the CJT TRPs a request may be transmitted to the UE to either indicate the phase delta (instantaneous) across a subset of TRPs, the first order variation in the relative phases, or both. In some aspects, the first order variation in co-phasing information may be TRP specific (e.g., for non-co-located TRPs) or common to a group of TRPs (e.g. for co-located TRPs). For example, phase variation may be identified according to:

$$\psi_i(n_k) = \psi_i(n_0) + \psi_i' \times (n_k - n_0)$$

where $\psi_i(n_k)$ is the cophasing angle for TRP i at slot $n_k$, $\psi_i'$ is the first order variation in the co-phasing information reported by the UE for TRP i, and $n_0$ is a reference slot configured by the network entity for phase tracking. In some aspects, there may be restrictions related to time periods of validity (e.g., an indicated time duration or a number of slots) after which a further update of the higher order phase variation information is provided. Such techniques may provide for efficient and reliable precoding for CJTs in the presence of time-varying phase changes at a UE.

Figure 4:
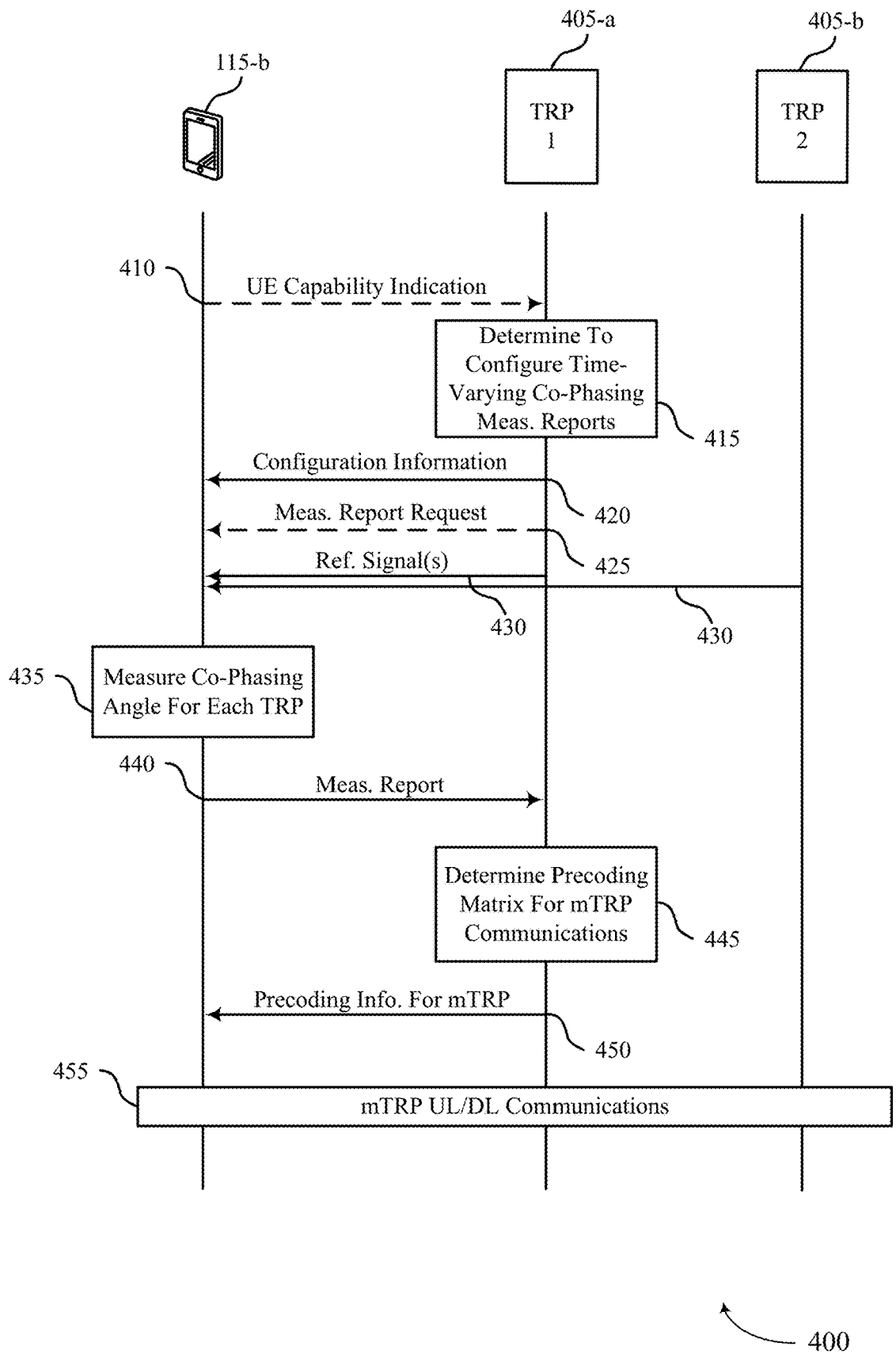
FIG. 4 shows an example of a process flow that supports time domain phase tracking for coherent joint communications with multiple TRPs in accordance with one or more aspects of the present disclosure.

FIG. 4 shows an example of a process flow 400 that supports time domain phase tracking for coherent joint communications with multiple TRPs in accordance with one or more aspects of the present disclosure. In some examples, the process flow 400 may be implemented by aspects of a wireless communications system 100, a wireless communications system 200, and may implement aspects of precoder matrix determination 300. For example, the process flow 400 may be implemented by a UE 115-b, a first TRP 405-a, and a second TRP 405-b, which may be in communication with a network entity (not shown), and which may be examples of UEs, TRPs, and network entities as described with reference to FIG. 1-3. Alternative examples of the following may be implemented, where some steps are performed in a different order than described or are not performed at all. In some cases, steps may include additional features not mentioned below, or further steps may be added.

At 410, optionally, the UE 115-b may transmit a UE capability indication to the first TRP 405-a. The UE capability indication may provide information related to the ability of the UE 115-b to perform measurements and reporting related to higher order phase variation. While the example of FIG. 4 shows the UE capability indication transmitted to, and received by, the first TRP 405-a, this indication may be provided to the second TRP 405-b instead, to both TRPs 405 in a CJT, or to a different network entity other than one of the TRPs 405.

At 415, the first TRP 405-a, or some other network entity, may determine to configure time-varying co-phasing measurement reports for the UE 115-b. In some cases, such a determination may be based on phase coherency for CJTs being broken for the UE 115-b on a regular basis (e.g., which may indicate UE 115-b mobility that may be reflected in TD or DD time-varying phase information). At 420, the first TRP 405-a (or other network entity) may transmit, and the UE 115-b may receive, configuration information that indicates higher order phase variation is to be reported. In some cases, the configuration information may be provided in RRC signaling, which configures a measurement report that can be used to provide one or more parameters related to higher order phase variation. In some cases, the configuration information may be provided with a CSI configuration. Additionally, or alternatively, the configuration information may be provided in DCI, in a medium access control (MAC) control element (CE), or any combinations thereof.

Optionally, at 425, the first TRP 405-*a* (or other network entity) may transmit, and the UE 115-*b* may receive, a measurement report request (e.g., a trigger for an aperiodic CSI measurement report). At 430, one or more reference signals may be transmitted by each of the TRPs 405 (e.g., CSI-RS transmissions). At 435, the UE 115-*b* may measure the reference signals, which may include measurement of co-phasing angles for each TRP 405, that may be used to provide higher order phase variation information with the measurement report. At 440, the UE 115-*b* may transmit the measurement report to the network entity via the first TRP 405-*a*.

At 445, the first TRP 405-*a* (or other network entity) may determine a precoding matrix for multi-TRP communications. In some cases, the precoding matrix may be determined in accordance with techniques as discussed herein with reference to FIG. 3. At 450, the first TRP 405-*a* (or other network entity) may transmit, and the UE 115-*b* may receive, precoding information for multi-TRP communications. At 455, the UE 115-*b*, the first TRP 405-*a*, and the second TRP 405-*b*, may perform multi-TRP CJT communications.

Figure 5:
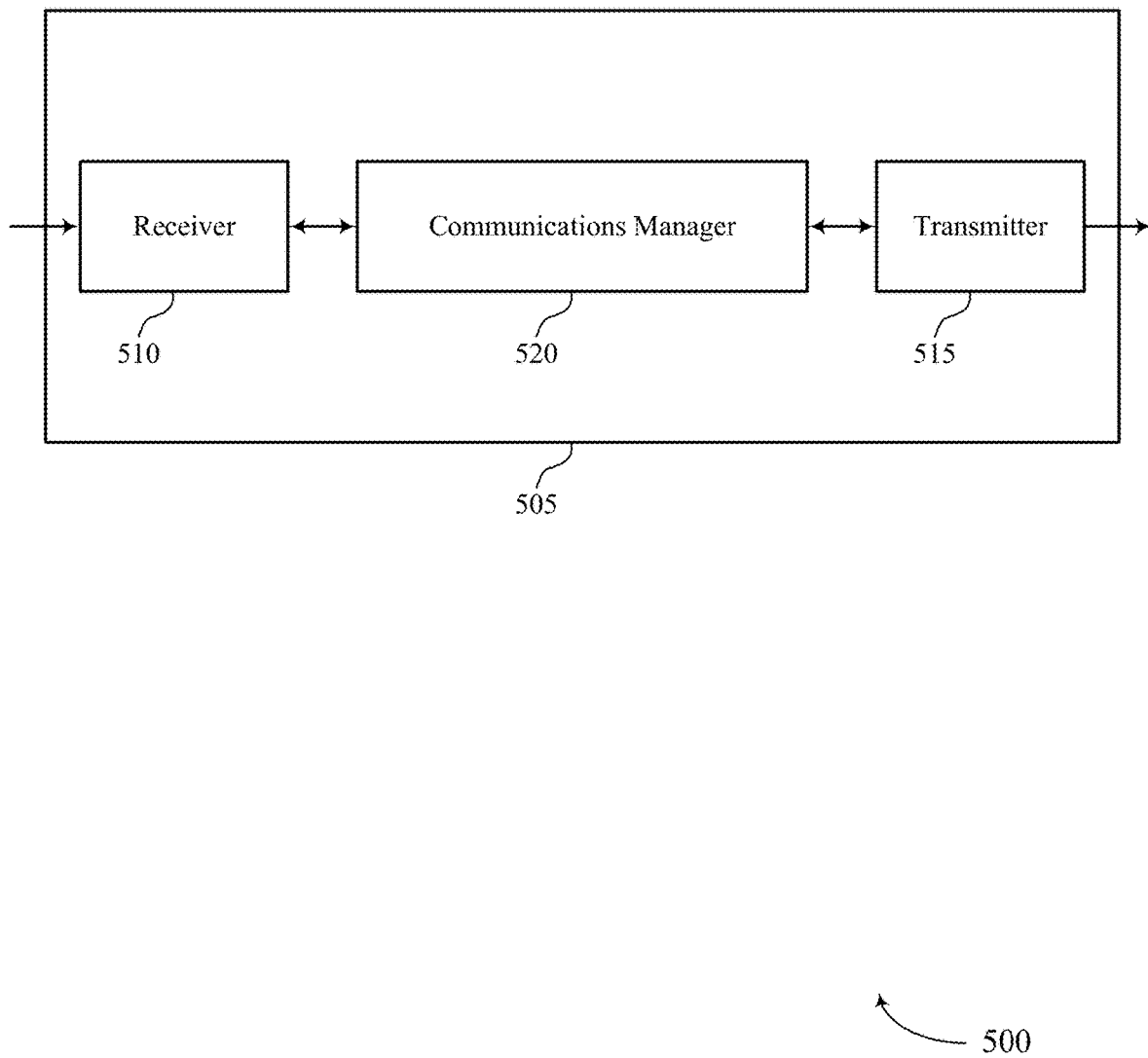
FIGS. 5 and 6 show block diagrams of devices that support time domain phase tracking for coherent joint communications with multiple TRPs in accordance with one or more aspects of the present disclosure.

FIG. 5 shows a block diagram 500 of a device 505 that supports time domain phase tracking for coherent joint communications with multiple TRPs in accordance with one or more aspects of the present disclosure. The device 505 may be an example of aspects of a UE 115 as described herein. The device 505 may include a receiver 510, a transmitter 515, and a communications manager 520. The device 505 may also include a processor (not shown). Each of these components may be in communication with one another (e.g., via one or more buses).

The receiver 510 may provide a means for receiving information such as packets, user data, control information, or any combination thereof associated with various information channels (e.g., control channels, data channels, information channels related to time domain phase tracking for coherent joint communications with multiple TRPs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to time domain phase tracking for coherent joint communications with multiple TRPs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of time domain phase tracking for coherent joint communications with multiple TRPs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor (not shown). If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 is capable of, configured to, or operable to support a means for receiving configuration information for coherent joint communications with two or more TRPs, the configuration information including an indication that time-varying co-phasing information associated with changes in relative phase information between the two or more TRPs is to be reported by the UE. The communications manager 520 is capable of, configured to, or operable to support a means for transmitting a measurement report that includes the time-varying co-phasing information based on a time-domain variation of measured phase information associated with each of the two or more TRPs.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for indication of time-varying phase information for mTRP CJT, which may provide more efficient utilization of communication resources, and enhance reliability of communications.

Figure 6:
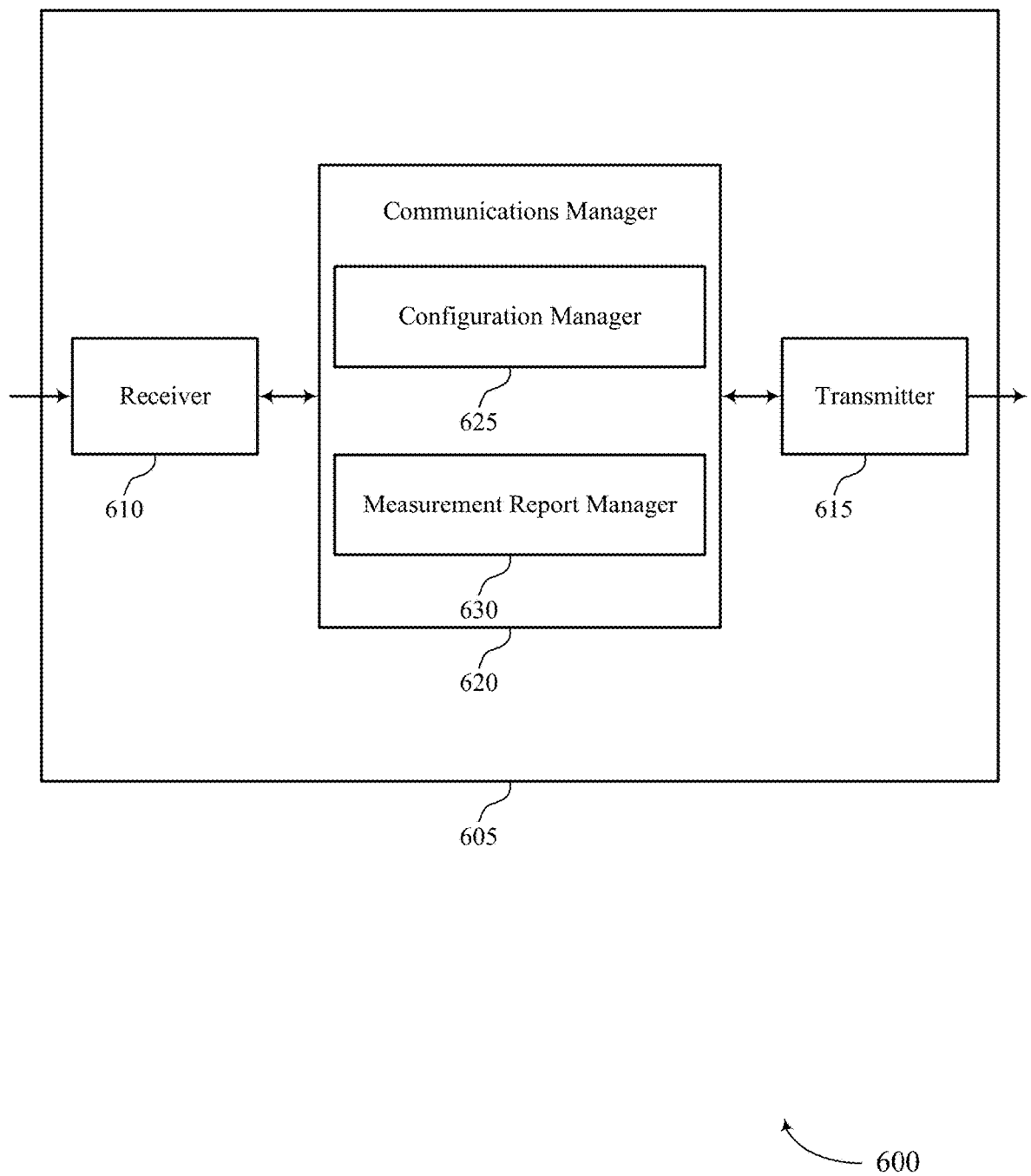

FIG. 6 shows a block diagram 600 of a device 605 that supports time domain phase tracking for coherent joint communications with multiple TRPs in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor (not shown).

Each of these components may be in communication with one another (e.g., via one or more buses).

The receiver 610 may provide a means for receiving information such as packets, user data, control information, or any combination thereof associated with various information channels (e.g., control channels, data channels, information channels related to time domain phase tracking for coherent joint communications with multiple TRPs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to time domain phase tracking for coherent joint communications with multiple TRPs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of time domain phase tracking for coherent joint communications with multiple TRPs as described herein. For example, the communications manager 620 may include a configuration manager 625 a measurement report manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The configuration manager 625 is capable of, configured to, or operable to support a means for receiving configuration information for coherent joint communications with two or more TRPs, the configuration information including an indication that time-varying co-phasing information associated with changes in relative phase information between the two or more TRPs is to be reported by the UE. The measurement report manager 630 is capable of, configured to, or operable to support a means for transmitting a measurement report that includes the time-varying co-phasing information based on a time-domain variation of measured phase information associated with each of the two or more TRPs.

Figure 7:
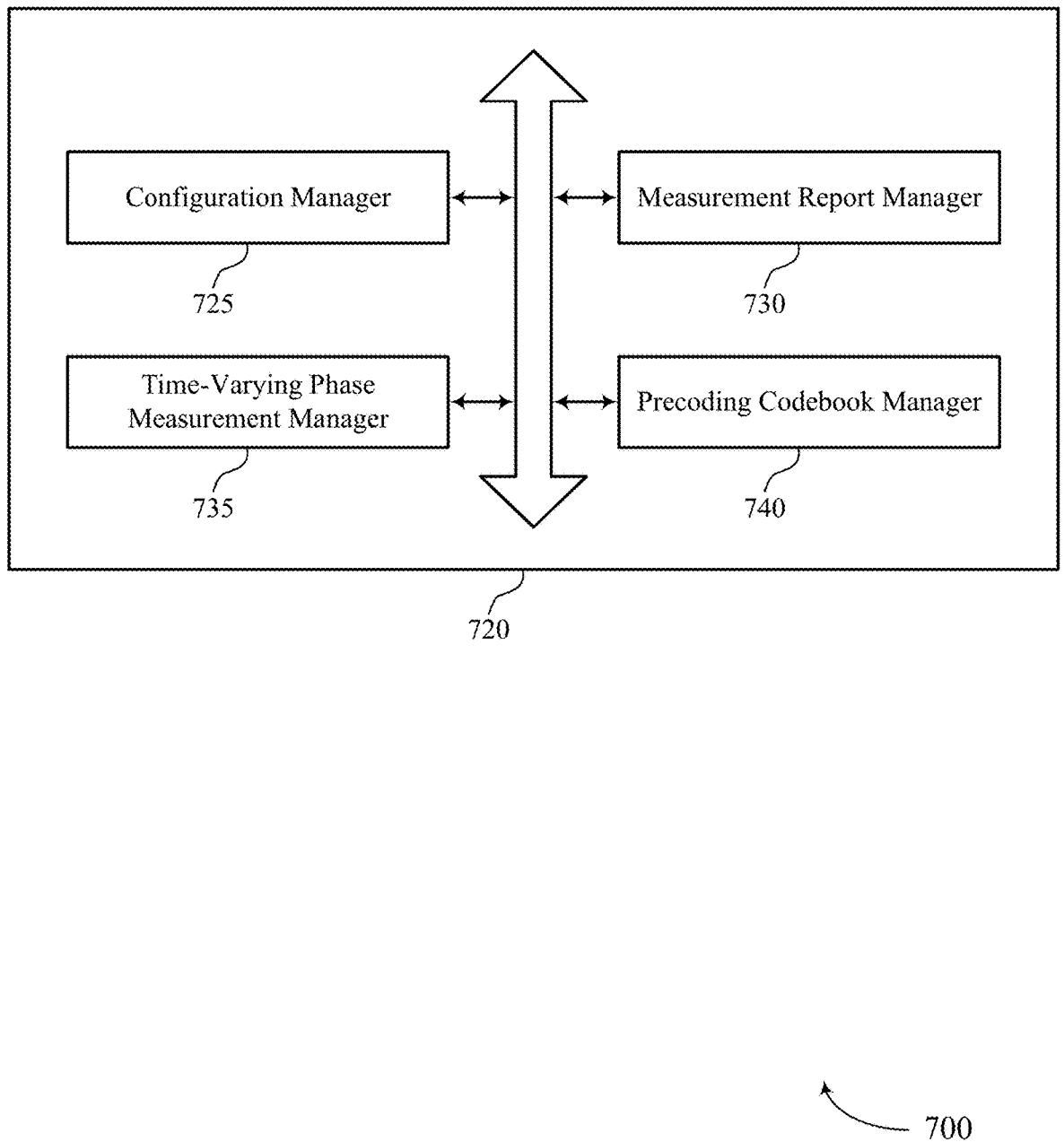
FIG. 7 shows a block diagram of a communications manager that supports time domain phase tracking for coherent joint communications with multiple TRPs in accordance with one or more aspects of the present disclosure.

FIG. 7 shows a block diagram 700 of a communications manager 720 that supports time domain phase tracking for coherent joint communications with multiple TRPs in accordance with one or more aspects of the present disclosure. The communications manager 720 may be an example of aspects of a communications manager 520, a communications manager 620, or both, as described herein. The communications manager 720, or various components thereof, may be an example of means for performing various aspects of time domain phase tracking for coherent joint communications with multiple TRPs as described herein. For example, the communications manager 720 may include a configuration manager 725, a measurement report manager 730, a time-varying phase measurement manager 735, a precoding codebook manager 740, or any combination thereof. Each of these components may communicate, directly or indirectly, with one another (e.g., via one or more buses).

The communications manager 720 may support wireless communication at a UE in accordance with examples as disclosed herein. The configuration manager 725 is capable of, configured to, or operable to support a means for receiving configuration information for coherent joint communications with two or more TRPs, the configuration information including an indication that time-varying co-phasing information associated with changes in relative phase information between the two or more TRPs is to be reported by the UE. The measurement report manager 730 is capable of, configured to, or operable to support a means for transmitting a measurement report that includes the time-varying co-phasing information based on a time-domain variation of measured phase information associated with each of the two or more TRPs.

In some examples, the measurement report manager 730 is capable of, configured to, or operable to support a means for transmitting an indication that the time-varying co-phasing information for the two or more TRPs can be reported by the UE. In some examples, the indication that the time-varying co-phasing information for the two or more TRPs can be reported by the UE is provided in a capability indication transmitted by the UE. In some examples, the indication that the time-varying co-phasing information for the two or more TRPs can be reported by the UE is provided in an initial measurement report associated with the two or more TRPs. In some examples, the indication that the time-varying co-phasing information for the two or more TRPs can be reported by the UE is provided based on an identification of a time variation of co-phasing angles associated with the two or more TRPs that exceeds a threshold value.

In some examples, the measurement report manager 730 is capable of, configured to, or operable to support a means for receiving a request to transmit the measurement report that includes the time-varying co-phasing information, and where the measurement report is transmitted responsive to the request. In some examples, the request to transmit the measurement report that includes the time-varying co-phasing information is provided responsive to a loss of phase coherence of the coherent joint communications with the two or more TRPs.

In some examples, the time-varying co-phasing information includes separate indications of the time-domain variation of measured phase information for each of the two or more TRPs, or includes a common indication of the time-domain variation of measured phase information that applies to each of the two or more TRPs. In some examples, the time-varying co-phasing information includes a first order variation in a co-phasing angle associated with at least a first transmission-reception point of the two or more TRPs, and where a co-phasing angle for the first transmission-reception point for a first slot is based on a phase angle associated with the first transmission-reception point at a reference slot, the first order variation in the co-phasing angle associated with the first transmission-reception point, and a time difference between the first slot and the reference slot. In some examples, the time-varying co-phasing information is valid for a time period associated with the coherent joint communications with the two or more TRPs.

In some examples, the precoding codebook manager 740 is capable of, configured to, or operable to support a means for transmitting a precoding codebook for each of the two or more TRPs that indicates the time-varying co-phasing information associated with each of the two or more TRPs. In some examples, the precoding codebook manager 740 is capable of, configured to, or operable to support a means for transmitting a precoding codebook that indicates common time-varying co-phasing information that is common across each transmission-reception point of the two or more TRPs.

Figure 8:
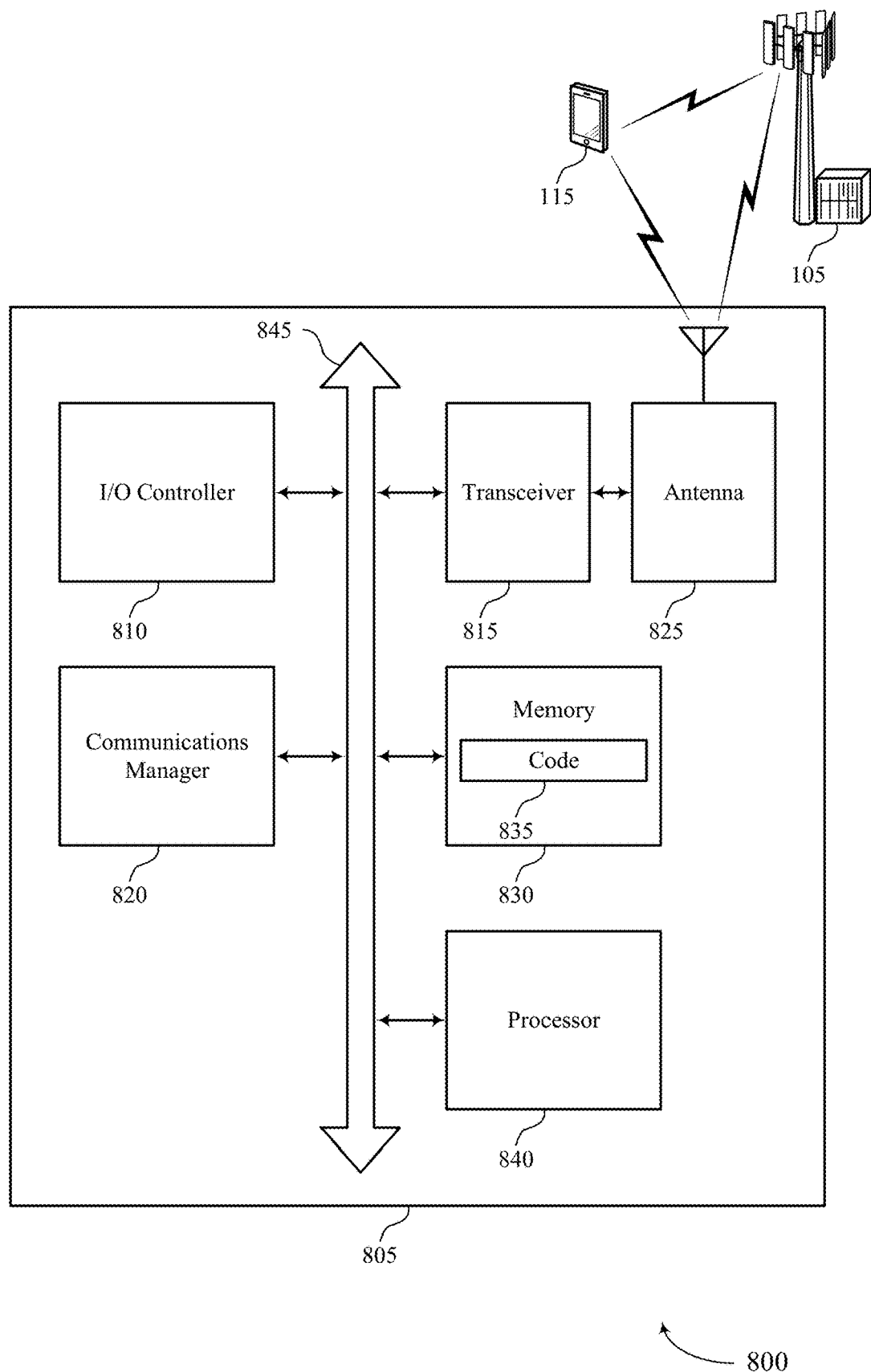
FIG. 8 shows a diagram of a system including a device that supports time domain phase tracking for coherent joint communications with multiple TRPs in accordance with one or more aspects of the present disclosure.

FIG. 8 shows a diagram of a system 800 including a device 805 that supports time domain phase tracking for coherent joint communications with multiple TRPs in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting time domain phase tracking for coherent joint communications with multiple TRPs). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 is capable of, configured to, or operable to support a means for receiving configuration information for coherent joint communications with two or more TRPs, the configuration information including an indication that time-varying co-phasing information associated with changes in relative phase information between the two or more TRPs is to be reported by the UE. The communications manager 820 is capable of, configured to, or operable to support a means for transmitting a measurement report that includes the time-varying co-phasing information based on a time-domain variation of measured phase information associated with each of the two or more TRPs.

By including or configuring the communications manager 820 in accordance with examples as described herein, the device 805 may support techniques for indication of time-varying phase information for mTRP CJT, which may provide more efficient utilization of communication resources, and enhance reliability of communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of time domain phase tracking for coherent joint communications with multiple TRPs as described herein, or the processor 840 and the memory 830 may be otherwise configured to perform or support such operations.

Figure 9:
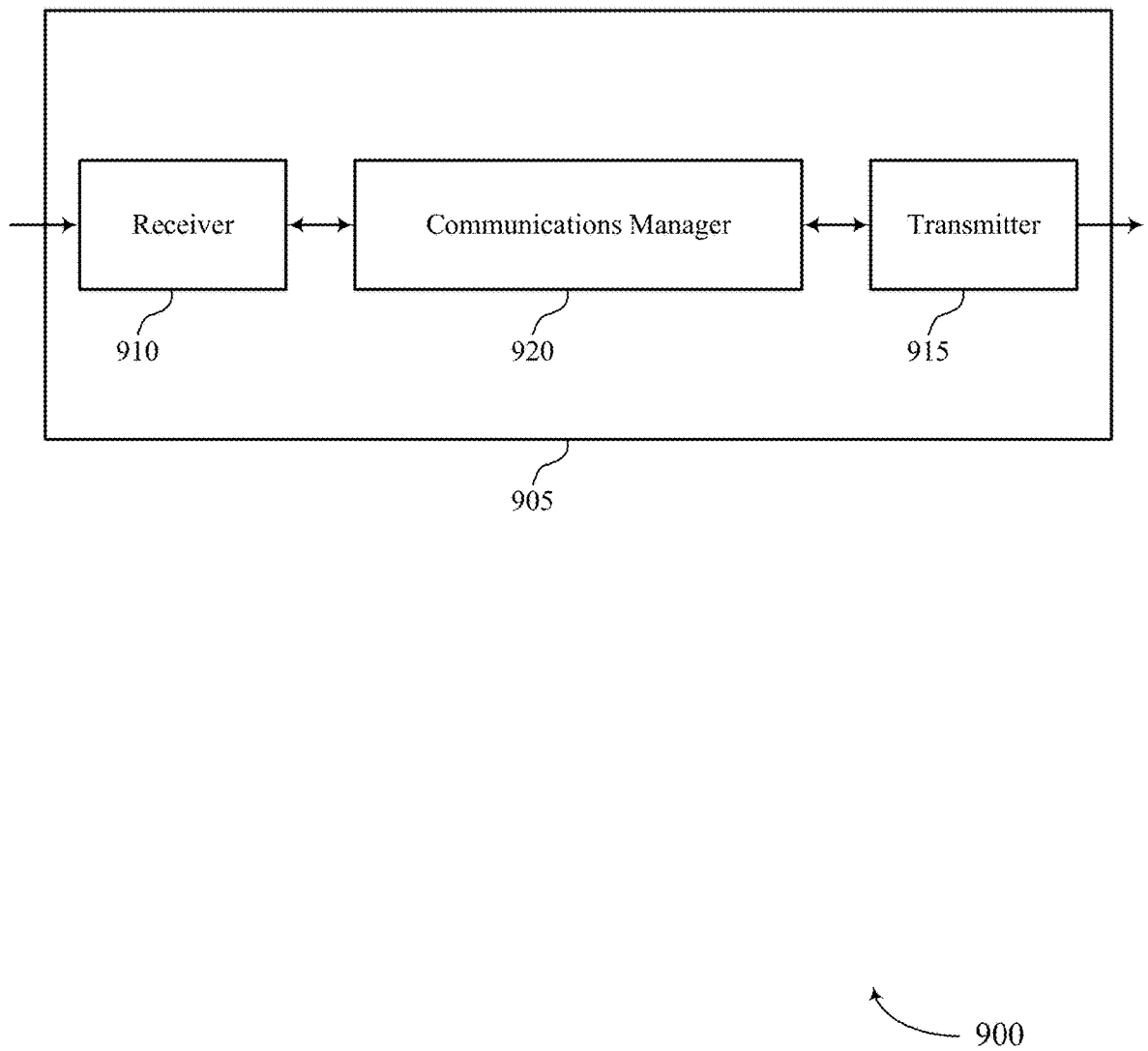
FIGS. 9 and 10 show block diagrams of devices that support time domain phase tracking for coherent joint communications with multiple TRPs in accordance with one or more aspects of the present disclosure.

FIG. 9 shows a block diagram 900 of a device 905 that supports time domain phase tracking for coherent joint communications with multiple TRPs in accordance with one or more aspects of the present disclosure. The device 905 may be an example of aspects of a network entity 105 as described herein. The device 905 may include a receiver 910, a transmitter 915, and a communications manager 920. The device 905 may also include a processor (not shown). Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of time domain phase tracking for coherent joint communications with multiple TRPs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor (not shown). If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at an access network entity in accordance with examples as disclosed herein. For example, the communications manager 920 is capable of, configured to, or operable to support a means for transmitting configuration information for coherent joint communications between a UE and two or more TRPs, the configuration information including an indication that time-varying co-phasing information associated with changes in relative phase information between the two or more TRPs is to be reported by the UE. The communications manager 920 is capable of, configured to, or operable to support a means for receiving a measurement report that includes the time-varying co-phasing information based on a time-domain variation of phase information measured at the UE for each of the two or more TRPs. The communications manager 920 is capable of, configured to, or operable to support a means for selecting a precoding matrix for the coherent joint communications based on the measurement report.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for indication of time-varying phase information for mTRP CJT, which may provide more efficient utilization of communication resources, and enhance reliability of communications.

Figure 10:
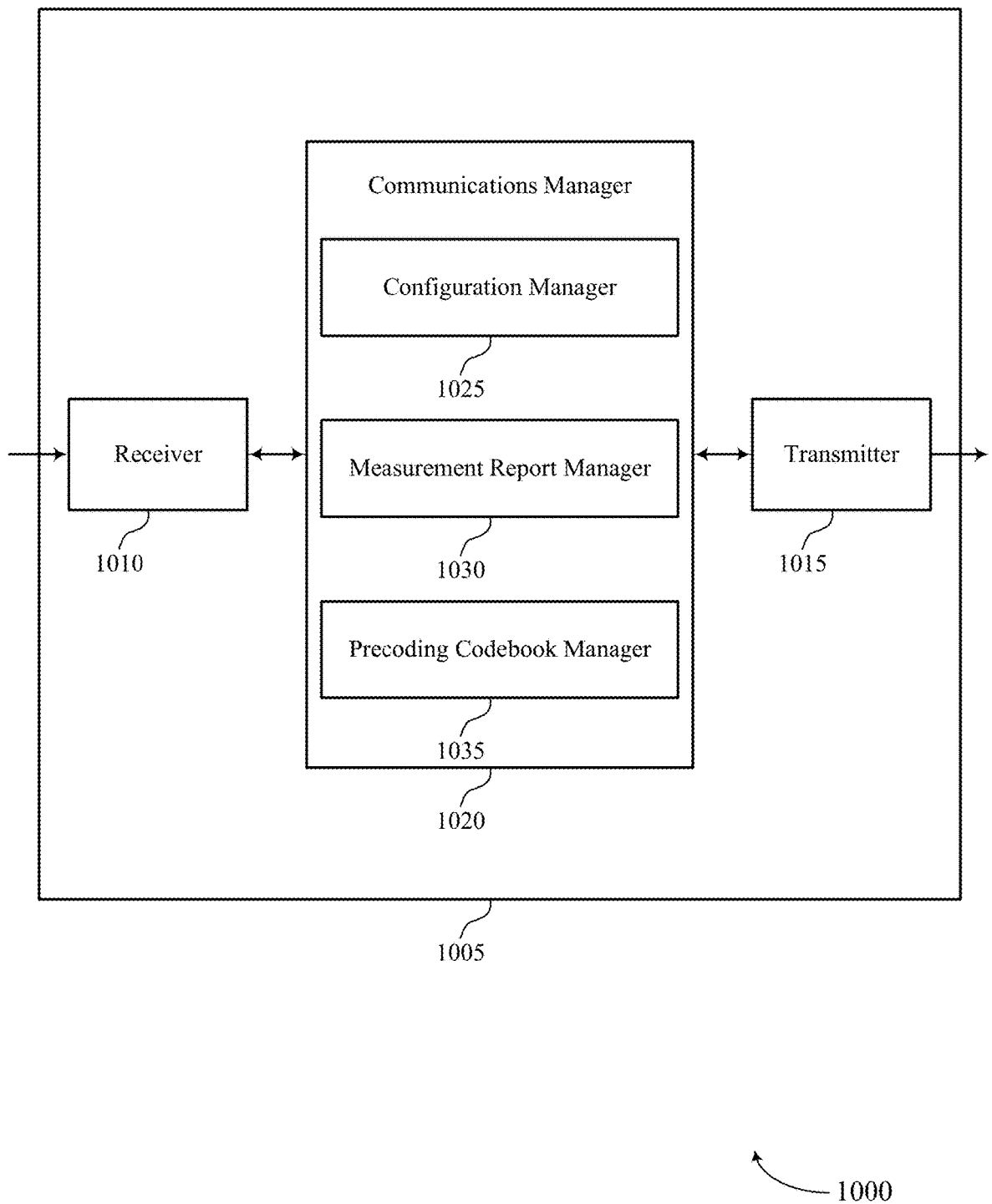

FIG. 10 shows a block diagram 1000 of a device 1005 that supports time domain phase tracking for coherent joint communications with multiple TRPs in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of time domain phase tracking for coherent joint communications with multiple TRPs as described herein. For example, the communications manager 1020 may include a configuration manager 1025, a measurement report manager 1030, a precoding codebook manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at an access network entity in accordance with examples as disclosed herein. The configuration manager 1025 is capable of, configured to, or operable to support a means for transmitting configuration information for coherent joint communications between a UE and two or more TRPs, the configuration information including an indication that time-varying co-phasing information associated with changes in relative phase information between the two or more TRPs is to be reported by the UE. The measurement report manager 1030 is capable of, configured to, or operable to support a means for receiving a measurement report that includes the time-varying co-phasing information based on a time-domain variation of phase information measured at the UE for each of the two or more TRPs. The precoding codebook manager 1035 is capable of, configured to, or operable to support a means for selecting a precoding matrix for the coherent joint communications based on the measurement report.

Figure 11:
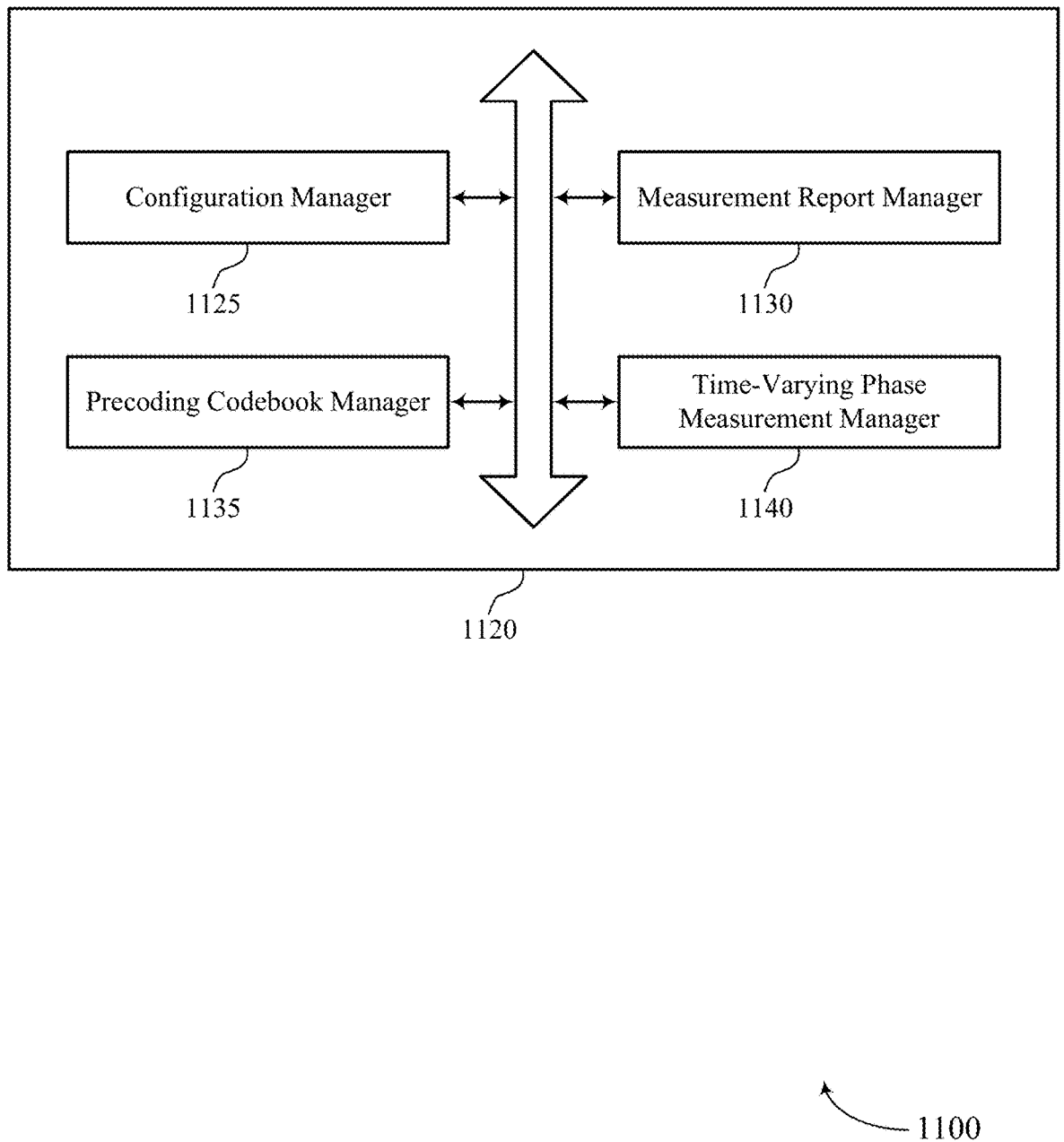
FIG. 11 shows a block diagram of a communications manager that supports time domain phase tracking for coherent joint communications with multiple TRPs in accordance with one or more aspects of the present disclosure.

FIG. 11 shows a block diagram 1100 of a communications manager 1120 that supports time domain phase tracking for coherent joint communications with multiple TRPs in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of time domain phase tracking for coherent joint communications with multiple TRPs as described herein. For example, the communications manager 1120 may include a configuration manager 1125, a measurement report manager 1130, a precoding codebook manager 1135, a time-varying phase measurement manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at an access network entity in accordance with examples as disclosed herein. The configuration manager 1125 is capable of, configured to, or operable to support a means for transmitting configuration information for coherent joint communications between a UE and two or more TRPs, the configuration information including an indication that time-varying co-phasing information associated with changes in relative phase information between the two or more TRPs is to be reported by the UE. The measurement report manager 1130 is capable of, configured to, or operable to support a means for receiving a measurement report that includes the time-varying co-phasing information based on a time-domain variation of phase information measured at the UE for each of the two or more TRPs. The precoding codebook manager 1135 is capable of, configured to, or operable to support a means for selecting a precoding matrix for the coherent joint communications based on the measurement report.

In some examples, the configuration manager 1125 is capable of, configured to, or operable to support a means for receiving an indication that the time-varying co-phasing information for the two or more TRPs can be reported by the UE. In some examples, the indication that the time-varying co-phasing information for the two or more TRPs can be reported by the UE is provided in a capability indication transmitted by the UE. In some examples, the indication that the time-varying co-phasing information for the two or more TRPs can be reported by the UE is provided in an initial measurement report associated with the two or more TRPs. In some examples, the indication that the time-varying co-phasing information for the two or more TRPs can be reported by the UE is provided based on an identification of a time variation of co-phasing angles associated with the two or more TRPs that exceeds a threshold value.

In some examples, the measurement report manager 1130 is capable of, configured to, or operable to support a means for transmitting, to the UE, a request to transmit the measurement report that includes the time-varying co-phasing information, and where the measurement report is responsive to the request. In some examples, the request to transmit the measurement report that includes the time-varying co-phasing information is provided responsive to a loss of phase coherence of the coherent joint communications with the two or more TRPs. In some examples, the time-varying co-phasing information includes separate indications of the time-domain variation of measured phase information for each of the two or more TRPs, or includes a common indication of the time-domain variation of measured phase information that applies to each of the two or more TRPs.

In some examples, the time-varying co-phasing information includes a first order variation in a co-phasing angle associated with at least a first transmission-reception point of the two or more TRPs, and where a co-phasing angle for the first transmission-reception point for a first slot is based on a phase angle associated with the first transmission-reception point at a reference slot, the first order variation in the co-phasing angle associated with the first transmission-reception point, and a time difference between the first slot and the reference slot. In some examples, the time-varying co-phasing information is valid for a time period associated with the coherent joint communications between the UE and the two or more TRPs.

In some examples, the precoding codebook manager 1135 is capable of, configured to, or operable to support a means for receiving, from the UE, a precoding codebook for each of the two or more TRPs that indicates the time-varying co-phasing information associated with each of the two or more TRPs. In some examples, the precoding codebook manager 1135 is capable of, configured to, or operable to support a means for receiving, from the UE, a precoding codebook that indicates common time-varying co-phasing information that is common across each transmission-reception point of the two or more TRPs.

Figure 12:
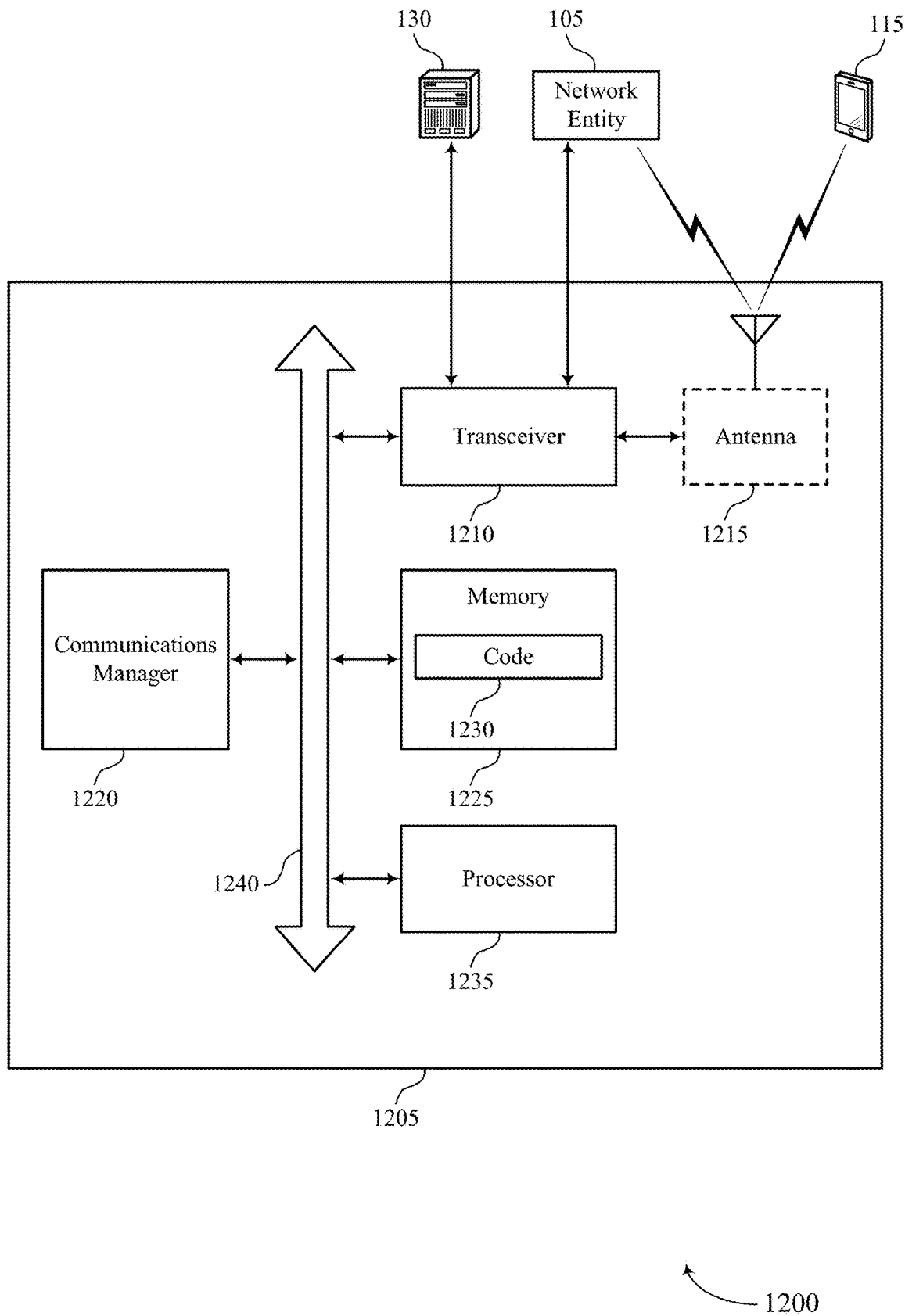
FIG. 12 shows a diagram of a system including a device that supports time domain phase tracking for coherent joint communications with multiple TRPs in accordance with one or more aspects of the present disclosure.

FIG. 12 shows a diagram of a system 1200 including a device 1205 that supports time domain phase tracking for coherent joint communications with multiple TRPs in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting time domain phase tracking for coherent joint communications with multiple TRPs). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at an access network entity in accordance with examples as disclosed herein. For example, the communications manager 1220 is capable of, configured to, or operable to support a means for transmitting configuration information for coherent joint communications between a UE and two or more TRPs, the configuration information including an indication that time-varying co-phasing information associated with changes in relative phase information between the two or more TRPs is to be reported by the UE. The communications manager 1220 is capable of, configured to, or operable to support a means for receiving a measurement report that includes the time-varying co-phasing information based on a time-domain variation of phase information measured at the UE for each of the two or more TRPs. The communications manager 1220 is capable of, configured to, or operable to support a means for selecting a precoding matrix for the coherent joint communications based on the measurement report.

By including or configuring the communications manager 1220 in accordance with examples as described herein, the device 1205 may support techniques for indication of time-varying phase information for mTRP CJT, which may provide more efficient utilization of communication resources, and enhance reliability of communications.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of time domain phase tracking for coherent joint communications with multiple TRPs as described herein, or the processor 1235 and the memory 1225 may be otherwise configured to perform or support such operations.

Figure 13:
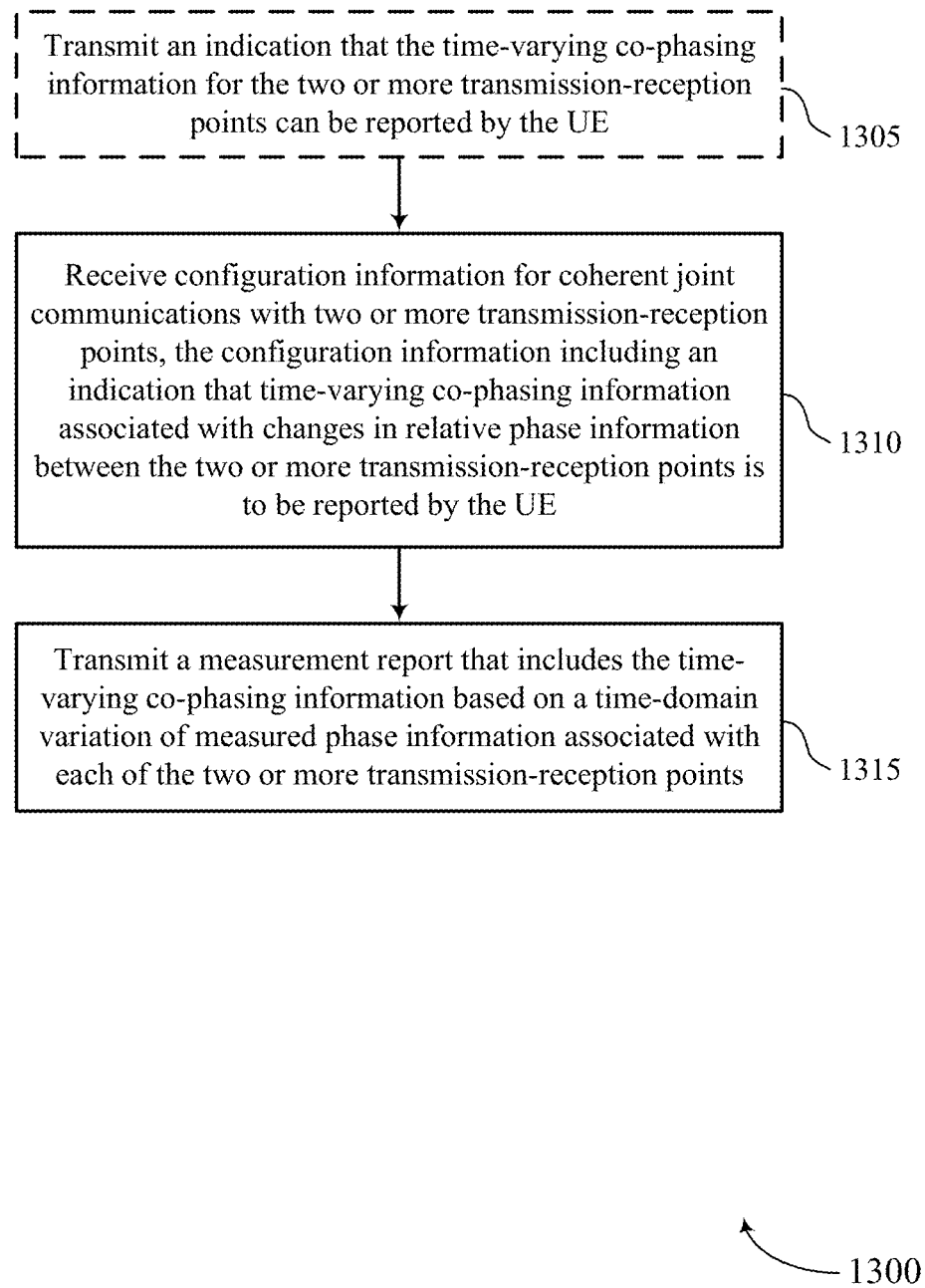
FIGS. 13 through 20 show flowcharts illustrating methods that support time domain phase tracking for coherent joint communications with multiple TRPs in accordance with one or more aspects of the present disclosure.

FIG. 13 shows a flowchart illustrating a method 1300 that supports time domain phase tracking for coherent joint communications with multiple TRPs in accordance with aspects of the present disclosure. The operations of the method 1300 may be implemented by a UE or its components as described herein. For example, the operations of the method 1300 may be performed by a UE 115 as described herein with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

Optionally, at 1305, the method may include transmitting an indication that the time-varying co-phasing information for the two or more TRPs can be reported by the UE. The operations of 1305 may be performed in accordance with examples as disclosed herein. In some examples, aspects of the operations of 1305 may be performed by a measurement report manager 730 as described herein with reference to FIG. 7.

At 1310, the method may include receiving configuration information for coherent joint communications with two or more TRPs, the configuration information including an indication that time-varying co-phasing information associated with changes in relative phase information between the two or more TRPs is to be reported by the UE. The operations of 1310 may be performed in accordance with examples as disclosed herein. In some examples, aspects of the operations of 1310 may be performed by a configuration manager 725 as described herein with reference to FIG. 7.

At 1315, the method may include transmitting a measurement report that includes the time-varying co-phasing information based on a time-domain variation of measured phase information associated with each of the two or more TRPs. The operations of 1315 may be performed in accordance with examples as disclosed herein. In some examples, aspects of the operations of 1315 may be performed by a measurement report manager 730 as described herein with reference to FIG. 7.

Figure 14:
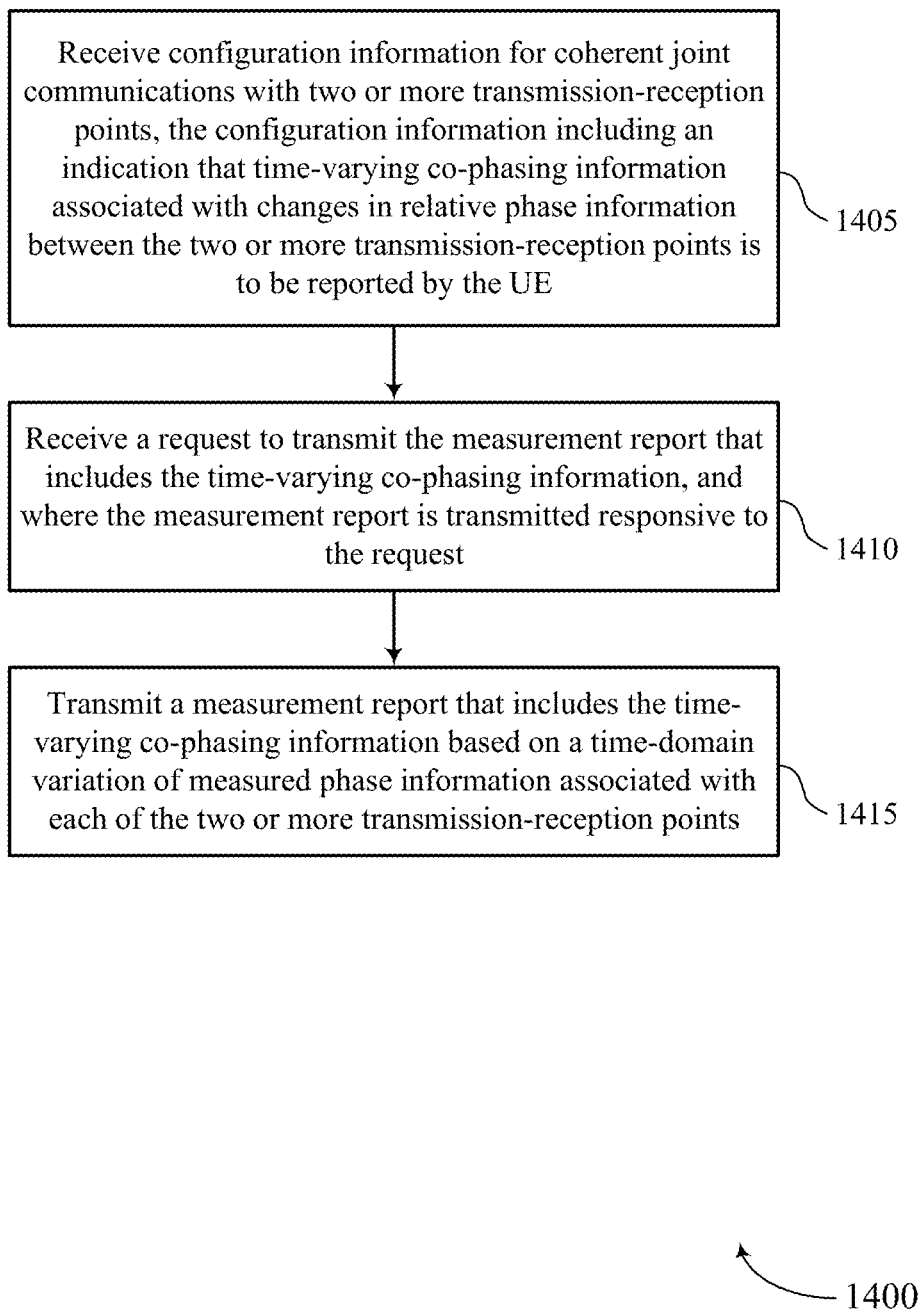

FIG. 14 shows a flowchart illustrating a method 1400 that supports time domain phase tracking for coherent joint communications with multiple TRPs in accordance with aspects of the present disclosure. The operations of the method 1400 may be implemented by a UE or its components as described herein. For example, the operations of the method 1400 may be performed by a UE 115 as described herein with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving configuration information for coherent joint communications with two or more TRPs, the configuration information including an indication that time-varying co-phasing information associated with changes in relative phase information between the two or more TRPs is to be reported by the UE. The operations of 1405 may be performed in accordance with examples as disclosed herein. In some examples, aspects of the operations of 1405 may be performed by a configuration manager 725 as described herein with reference to FIG. 7.

At 1410, the method may include receiving a request to transmit the measurement report that includes the time-varying co-phasing information, and where the measurement report is transmitted responsive to the request. The operations of 1410 may be performed in accordance with examples as disclosed herein. In some examples, aspects of the operations of 1410 may be performed by a measurement report manager 730 as described herein with reference to FIG. 7.

At 1415, the method may include transmitting a measurement report that includes the time-varying co-phasing information based on a time-domain variation of measured phase information associated with each of the two or more TRPs. The operations of 1415 may be performed in accordance with examples as disclosed herein. In some examples, aspects of the operations of 1415 may be performed by a measurement report manager 730 as described herein with reference to FIG. 7.

Figure 15:
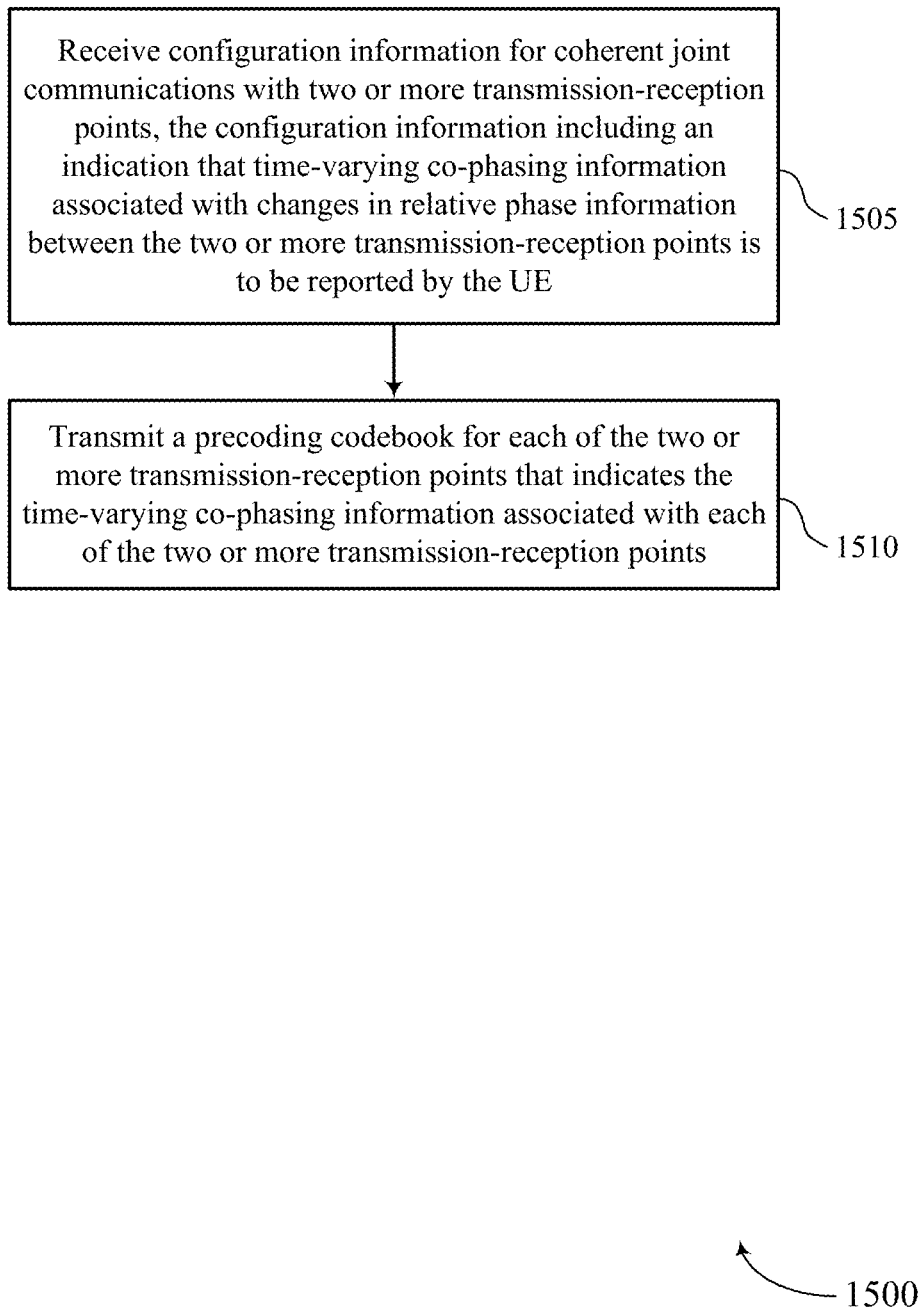

FIG. 15 shows a flowchart illustrating a method 1500 that supports time domain phase tracking for coherent joint communications with multiple TRPs in accordance with aspects of the present disclosure. The operations of the method 1500 may be implemented by a UE or its components as described herein. For example, the operations of the method 1500 may be performed by a UE 115 as described herein with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving configuration information for coherent joint communications with two or more TRPs, the configuration information including an indication that time-varying co-phasing information associated with changes in relative phase information between the two or more TRPs is to be reported by the UE. The operations of 1505 may be performed in accordance with examples as disclosed herein. In some examples, aspects of the operations of 1505 may be performed by a configuration manager 725 as described herein with reference to FIG. 7.

At 1510, the method may include transmitting a precoding codebook for each of the two or more TRPs that indicates the time-varying co-phasing information associated with each of the two or more TRPs. The operations of 1510 may be performed in accordance with examples as disclosed herein. In some examples, aspects of the operations of 1510 may be performed by a precoding codebook manager 740 as described herein with reference to FIG. 7.

Figure 16:
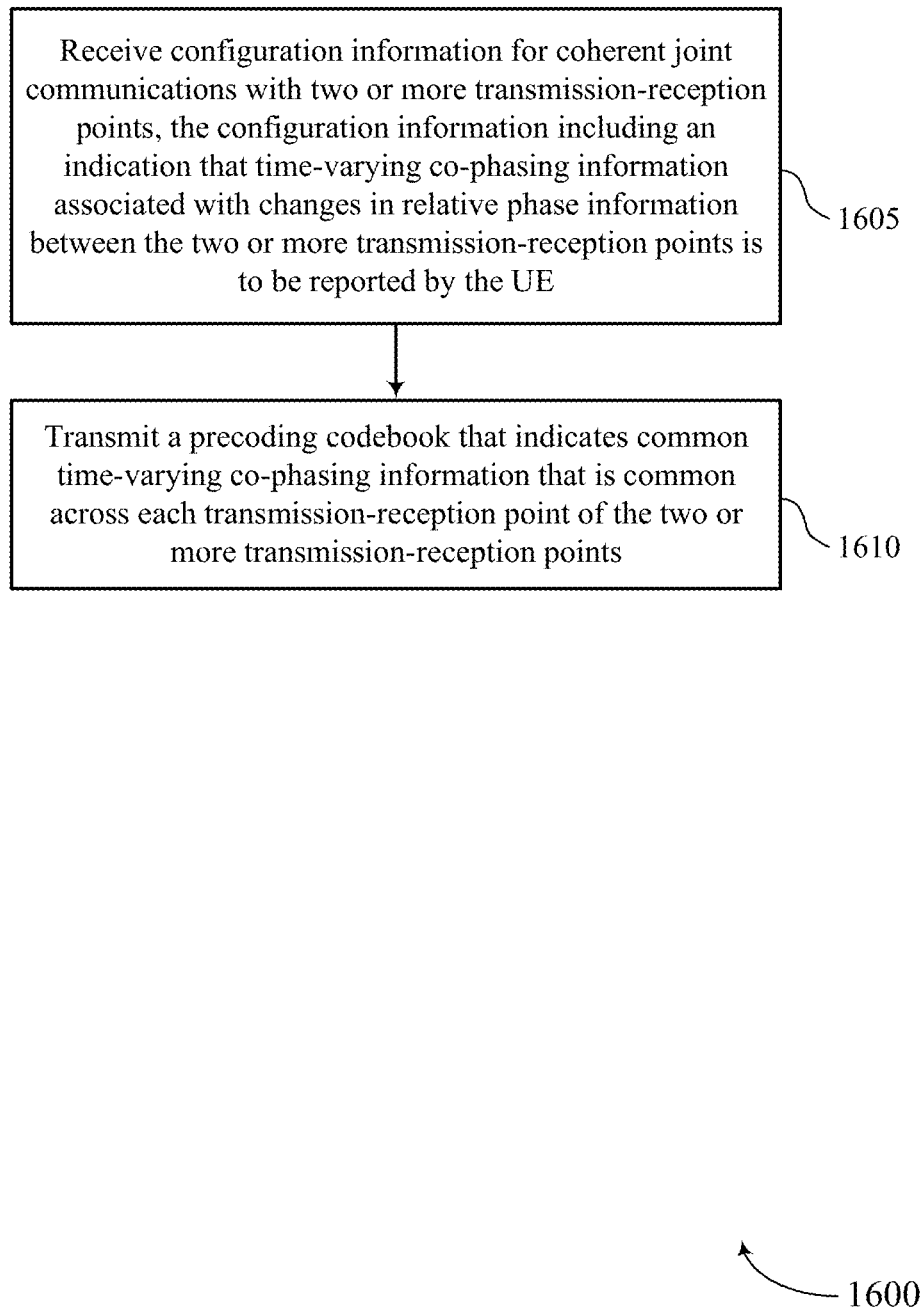

FIG. 16 shows a flowchart illustrating a method 1600 that supports time domain phase tracking for coherent joint communications with multiple TRPs in accordance with aspects of the present disclosure. The operations of the method 1600 may be implemented by a UE or its components as described herein. For example, the operations of the method 1600 may be performed by a UE 115 as described herein with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1605, the method may include receiving configuration information for coherent joint communications with two or more TRPs, the configuration information including an indication that time-varying co-phasing information associated with changes in relative phase information between the two or more TRPs is to be reported by the UE. The operations of 1605 may be performed in accordance with examples as disclosed herein. In some examples, aspects of the operations of 1605 may be performed by a configuration manager 725 as described herein with reference to FIG. 7.

At 1610, the method may include transmitting a precoding codebook that indicates common time-varying co-phasing information that is common across each transmission-reception point of the two or more TRPs. The operations of 1610 may be performed in accordance with examples as disclosed herein. In some examples, aspects of the operations of 1610 may be performed by a precoding codebook manager 740 as described herein with reference to FIG. 7.

Figure 17:
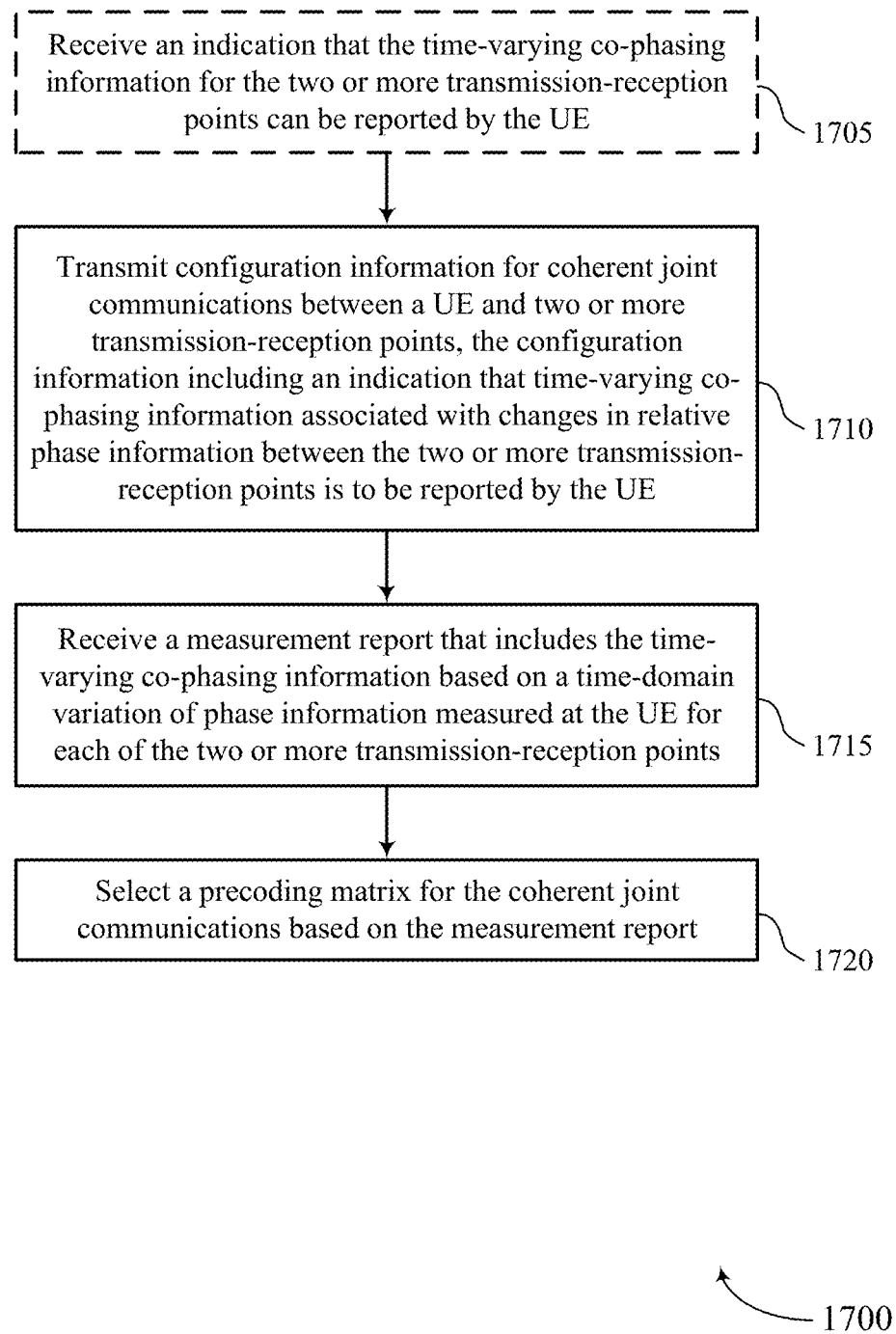

FIG. 17 shows a flowchart illustrating a method 1700 that supports time domain phase tracking for coherent joint communications with multiple TRPs in accordance with aspects of the present disclosure. The operations of the method 1700 may be implemented by a network entity or its components as described herein. For example, the operations of the method 1700 may be performed by a network entity as described herein with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

Optionally, at 1705, the method may include receiving an indication that the time-varying co-phasing information for the two or more TRPs can be reported by the UE. The operations of 1705 may be performed in accordance with examples as disclosed herein. In some examples, aspects of the operations of 1705 may be performed by a configuration manager 1125 as described herein with reference to FIG. 11.

At 1710, the method may include transmitting configuration information for coherent joint communications between a UE and two or more TRPs, the configuration information including an indication that time-varying co-phasing information associated with changes in relative phase information between the two or more TRPs is to be reported by the UE. The operations of 1710 may be performed in accordance with examples as disclosed herein. In some examples, aspects of the operations of 1710 may be performed by a configuration manager 1125 as described herein with reference to FIG. 11.

At 1715, the method may include receiving a measurement report that includes the time-varying co-phasing information based on a time-domain variation of phase information measured at the UE for each of the two or more TRPs. The operations of 1715 may be performed in accordance with examples as disclosed herein. In some examples, aspects of the operations of 1715 may be performed by a measurement report manager 1130 as described herein with reference to FIG. 11.

At 1720, the method may include selecting a precoding matrix for the coherent joint communications based on the measurement report. The operations of 1720 may be performed in accordance with examples as disclosed herein. In some examples, aspects of the operations of 1720 may be performed by a precoding codebook manager 1135 as described herein with reference to FIG. 11.

Figure 18:
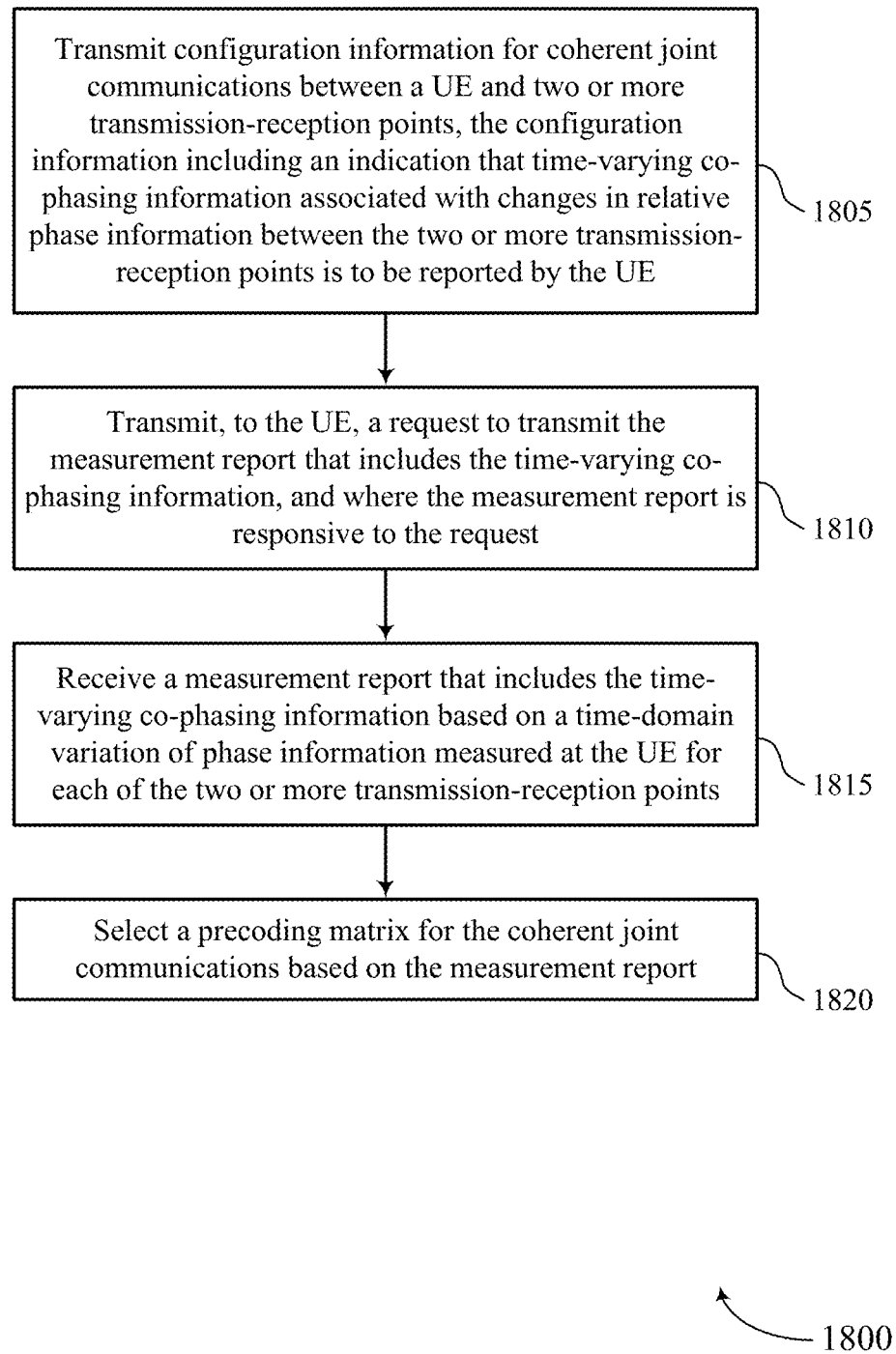

FIG. 18 shows a flowchart illustrating a method 1800 that supports time domain phase tracking for coherent joint communications with multiple TRPs in accordance with aspects of the present disclosure. The operations of the method 1800 may be implemented by a network entity or its components as described herein. For example, the operations of the method 1800 may be performed by a network entity as described herein with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include transmitting configuration information for coherent joint communications between a UE and two or more TRPs, the configuration information including an indication that time-varying co-phasing information associated with changes in relative phase information between the two or more TRPs is to be reported by the UE. The operations of 1805 may be performed in accordance with examples as disclosed herein. In some examples, aspects of the operations of 1805 may be performed by a configuration manager 1125 as described herein with reference to FIG. 11.

At 1810, the method may include transmitting, to the UE, a request to transmit the measurement report that includes the time-varying co-phasing information, and where the measurement report is responsive to the request. The operations of 1810 may be performed in accordance with examples as disclosed herein. In some examples, aspects of the operations of 1810 may be performed by a measurement report manager 1130 as described herein with reference to FIG. 11.

At 1815, the method may include receiving a measurement report that includes the time-varying co-phasing information based on a time-domain variation of phase information measured at the UE for each of the two or more TRPs. The operations of 1815 may be performed in accordance with examples as disclosed herein. In some examples, aspects of the operations of 1815 may be performed by a measurement report manager 1130 as described herein with reference to FIG. 11.

At 1820, the method may include selecting a precoding matrix for the coherent joint communications based on the measurement report. The operations of 1820 may be performed in accordance with examples as disclosed herein. In some examples, aspects of the operations of 1820 may be performed by a precoding codebook manager 1135 as described herein with reference to FIG. 11.

Figure 19:
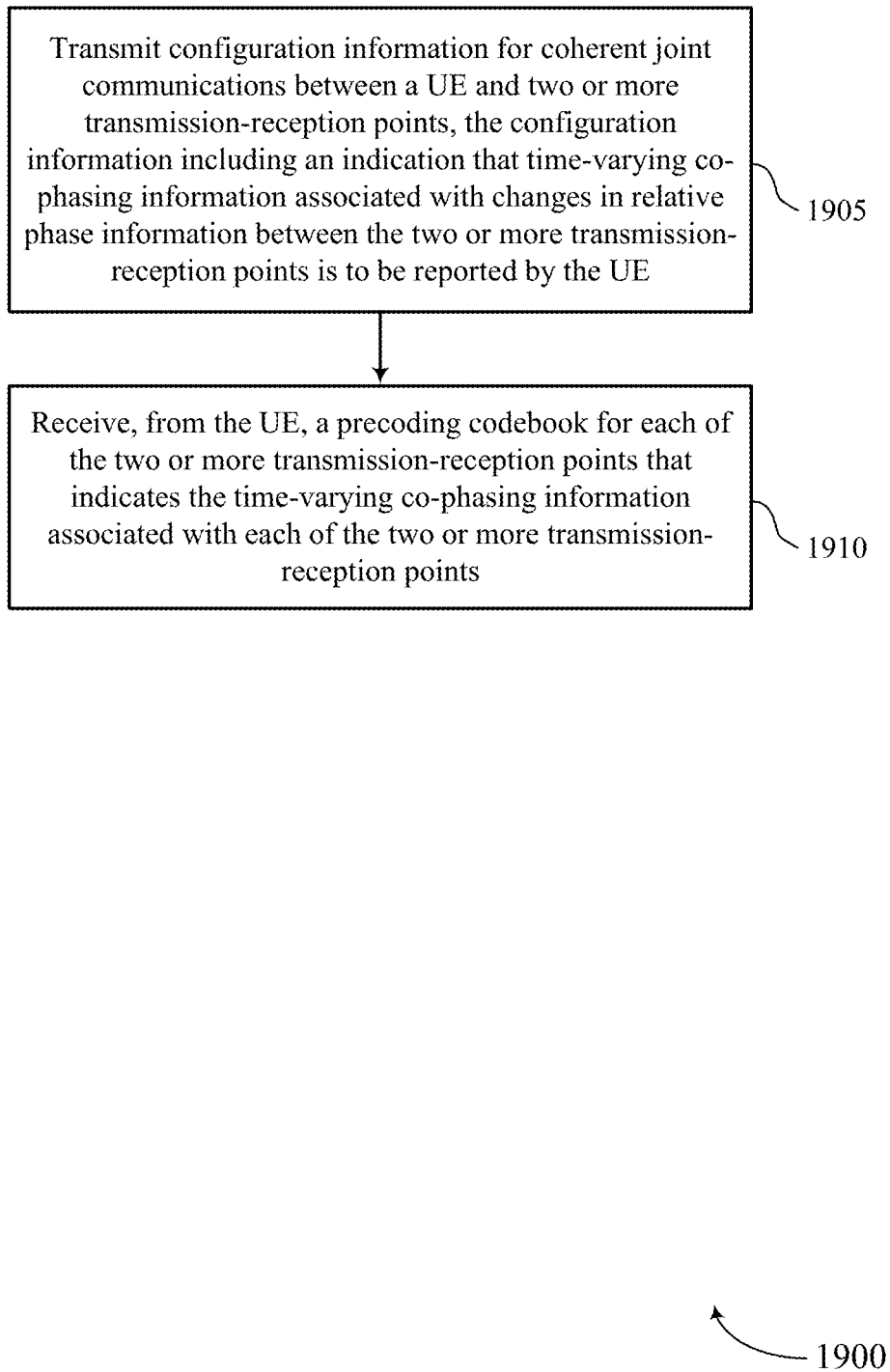

FIG. 19 shows a flowchart illustrating a method 1900 that supports time domain phase tracking for coherent joint communications with multiple TRPs in accordance with aspects of the present disclosure. The operations of the method 1900 may be implemented by a network entity or its components as described herein. For example, the operations of the method 1900 may be performed by a network entity as described herein with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1905, the method may include transmitting configuration information for coherent joint communications between a UE and two or more TRPs, the configuration information including an indication that time-varying co-phasing information associated with changes in relative phase information between the two or more TRPs is to be reported by the UE. The operations of 1905 may be performed in accordance with examples as disclosed herein. In some examples, aspects of the operations of 1905 may be performed by a configuration manager 1125 as described herein with reference to FIG. 11.

At 1910, the method may include receiving, from the UE, a precoding codebook for each of the two or more TRPs that indicates the time-varying co-phasing information associated with each of the two or more TRPs. The operations of 1910 may be performed in accordance with examples as disclosed herein. In some examples, aspects of the operations of 1910 may be performed by a precoding codebook manager 1135 as described herein with reference to FIG. 11.

Figure 20:
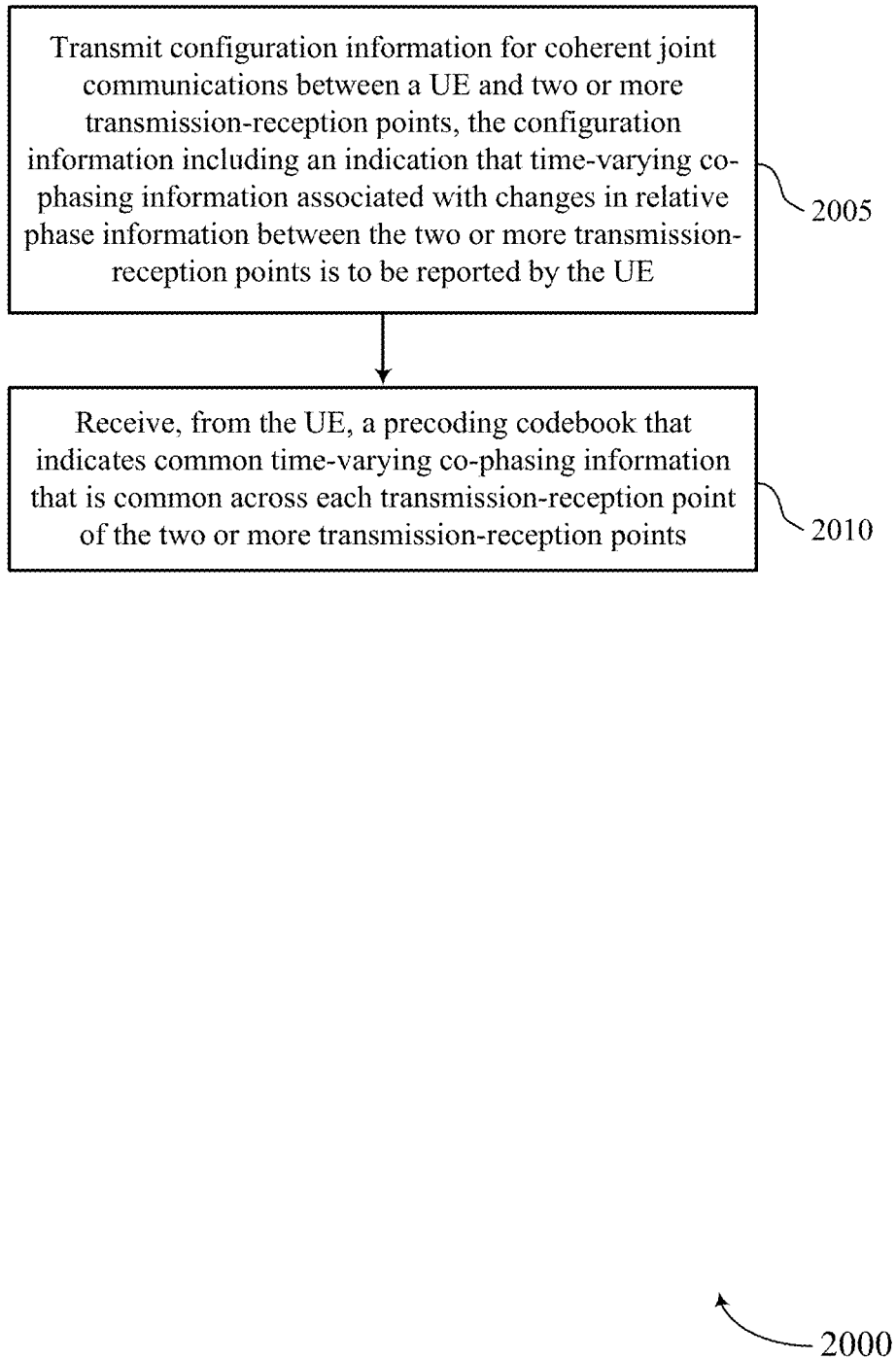

FIG. 20 shows a flowchart illustrating a method 2000 that supports time domain phase tracking for coherent joint communications with multiple TRPs in accordance with aspects of the present disclosure. The operations of the method 2000 may be implemented by a network entity or its components as described herein. For example, the operations of the method 2000 may be performed by a network entity as described herein with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 2005, the method may include transmitting configuration information for coherent joint communications between a UE and two or more TRPs, the configuration information including an indication that time-varying co-phasing information associated with changes in relative phase information between the two or more TRPs is to be reported by the UE. The operations of 2005 may be performed in accordance with examples as disclosed herein. In some examples, aspects of the operations of 2005 may be performed by a configuration manager 1125 as described herein with reference to FIG. 11.

At 2010, the method may include receiving, from the UE, a precoding codebook that indicates common time-varying co-phasing information that is common across each transmission-reception point of the two or more TRPs. The operations of 2010 may be performed in accordance with examples as disclosed herein. In some examples, aspects of the operations of 2010 may be performed by a precoding codebook manager 1135 as described herein with reference to FIG. 11.

The following provides an overview of aspects of the present disclosure:

Aspect 1: A method for wireless communication at a UE, comprising: receiving configuration information for coherent joint communications with two or more transmission-reception points, the configuration information including an indication that time-varying co-phasing information associated with changes in relative phase information between the two or more transmission-reception points is to be reported by the UE; and transmitting a measurement report that includes the time-varying co-phasing information based at least in part on a time-domain variation of measured phase information associated with each of the two or more transmission-reception points.

Aspect 2: The method of aspect 1, further comprising: transmitting an indication that the time-varying co-phasing information for the two or more transmission-reception points can be reported by the UE.

Aspect 3: The method of aspect 2, wherein the indication that the time-varying co-phasing information for the two or more transmission-reception points can be reported by the UE is provided in a capability indication transmitted by the UE.

Aspect 4: The method of any of aspects 2 through 3, wherein the indication that the time-varying co-phasing information for the two or more transmission-reception points can be reported by the UE is provided in an initial measurement report associated with the two or more transmission-reception points.

Aspect 5: The method of aspect 4, wherein the indication that the time-varying co-phasing information for the two or more transmission-reception points can be reported by the UE is provided based at least in part on an identification of a time variation of co-phasing angles associated with the two or more transmission-reception points that exceeds a threshold value.

Aspect 6: The method of any of aspects 1 through 5, further comprising: receiving a request to transmit the measurement report that includes the time-varying co-phasing information, and wherein the measurement report is transmitted responsive to the request.

Aspect 7: The method of aspect 6, wherein the request to transmit the measurement report that includes the time-varying co-phasing information is provided responsive to a loss of phase coherence of the coherent joint communications with the two or more transmission-reception points.

Aspect 8: The method of any of aspects 1 through 7, wherein the time-varying co-phasing information includes separate indications of the time-domain variation of measured phase information for each of the two or more transmission-reception points, or includes a common indication of the time-domain variation of measured phase information that applies to each of the two or more transmission-reception points.

Aspect 9: The method of any of aspects 1 through 8, wherein the time-varying co-phasing information includes a first order variation in a co-phasing angle associated with at least a first transmission-reception point of the two or more transmission-reception points, and wherein a co-phasing angle for the first transmission-reception point for a first slot is based at least in part on a phase angle associated with the first transmission-reception point at a reference slot, the first order variation in the co-phasing angle associated with the first transmission-reception point, and a time difference between the first slot and the reference slot.

Aspect 10: The method of any of aspects 1 through 9, wherein the time-varying co-phasing information is valid for a time period associated with the coherent joint communications with the two or more transmission-reception points.

Aspect 11: The method of any of aspects 1 through 10, further comprising: transmitting a precoding codebook for each of the two or more transmission-reception points that indicates the time-varying co-phasing information associated with each of the two or more transmission-reception points.

Aspect 12: The method of any of aspects 1 through 11, further comprising: transmitting a precoding codebook that indicates common time-varying co-phasing information that is common across each transmission-reception point of the two or more transmission-reception points.

Aspect 13: A method for wireless communication at an access network entity, comprising: transmitting configuration information for coherent joint communications between a UE and two or more transmission-reception points, the configuration information including an indication that time-varying co-phasing information associated with changes in relative phase information between the two or more transmission-reception points is to be reported by the UE; receiving a measurement report that includes the time-varying co-phasing information based at least in part on a time-domain variation of phase information measured at the UE for each of the two or more transmission-reception points; and selecting a precoding matrix for the coherent joint communications based at least in part on the measurement report.

Aspect 14: The method of aspect 13, further comprising: receiving an indication that the time-varying co-phasing information for the two or more transmission-reception points can be reported by the UE.

Aspect 15: The method of aspect 14, wherein the indication that the time-varying co-phasing information for the two or more transmission-reception points can be reported by the UE is provided in a capability indication transmitted by the UE.

Aspect 16: The method of any of aspects 14 through 15, wherein the indication that the time-varying co-phasing information for the two or more transmission-reception points can be reported by the UE is provided in an initial measurement report associated with the two or more transmission-reception points.

Aspect 17: The method of aspect 16, wherein the indication that the time-varying co-phasing information for the two or more transmission-reception points can be reported by the UE is provided based at least in part on an identification of a time variation of co-phasing angles associated with the two or more transmission-reception points that exceeds a threshold value.

Aspect 18: The method of any of aspects 13 through 17, further comprising: transmitting, to the UE, a request to transmit the measurement report that includes the time-varying co-phasing information, and wherein the measurement report is responsive to the request.

Aspect 19: The method of aspect 18, wherein the request to transmit the measurement report that includes the time-varying co-phasing information is provided responsive to a loss of phase coherence of the coherent joint communications with the two or more transmission-reception points.

Aspect 20: The method of any of aspects 13 through 19, wherein the time-varying co-phasing information includes separate indications of the time-domain variation of measured phase information for each of the two or more transmission-reception points, or includes a common indication of the time-domain variation of measured phase information that applies to each of the two or more transmission-reception points.

Aspect 21: The method of any of aspects 13 through 20, wherein the time-varying co-phasing information includes a first order variation in a co-phasing angle associated with at least a first transmission-reception point of the two or more transmission-reception points, and wherein a co-phasing angle for the first transmission-reception point for a first slot is based at least in part on a phase angle associated with the first transmission-reception point at a reference slot, the first order variation in the co-phasing angle associated with the first transmission-reception point, and a time difference between the first slot and the reference slot.

Aspect 22: The method of any of aspects 13 through 21, wherein the time-varying co-phasing information is valid for a time period associated with the coherent joint communications between the UE and the two or more transmission-reception points.

Aspect 23: The method of any of aspects 13 through 22, further comprising: receiving, from the UE, a precoding codebook for each of the two or more transmission-reception points that indicates the time-varying co-phasing information associated with each of the two or more transmission-reception points.

Aspect 24: The method of any of aspects 13 through 23, further comprising: receiving, from the UE, a precoding codebook that indicates common time-varying co-phasing information that is common across each transmission-reception point of the two or more transmission-reception points.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at an access network entity, comprising a processor; memory coupled with the processor; and instructions stored in the memory and executable by the processor to cause the apparatus to perform a method of any of aspects 13 through 24.

Aspect 29: An apparatus for wireless communication at an access network entity, comprising at least one means for performing a method of any of aspects 13 through 24.

Aspect 30: A non-transitory computer-readable medium storing code for wireless communication at an access network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor; and
   a memory coupled with the processor with instructions stored in the memory, the instructions being executable by the processor to cause the apparatus to:
      receive configuration information for coherent joint communications with two or more transmission-reception points, the configuration information including an indication that time-varying co-phasing information associated with changes in relative phase information between the two or more transmission-reception points is to be reported by the UE; and
      transmit a measurement report that includes the time-varying co-phasing information based at least in part on a time-domain variation of measured phase information associated with each of the two or more transmission-reception points, wherein the time-varying co-phasing information includes a first order variation in a co-phasing angle associated with at least a first transmission-reception point of the two or more transmission-reception points, and wherein a co-phasing angle for the first transmission-reception point for a first slot is based at least in part on a phase angle associated with the first transmission-reception point at a reference slot, the first order variation in the co-phasing angle associated with the first transmission-reception point, and a time difference between the first slot and the reference slot.

2. The apparatus of claim 1, wherein the instructions are further executable by the processor to cause the apparatus to:
   transmit an indication that the time-varying co-phasing information for the two or more transmission-reception points can be reported by the UE.

3. The apparatus of claim 2, wherein the indication that the time-varying co-phasing information for the two or more transmission-reception points can be reported by the UE is provided in a capability indication transmitted by the UE.

4. The apparatus of claim 2, wherein the indication that the time-varying co-phasing information for the two or more transmission-reception points can be reported by the UE is provided in an initial measurement report associated with the two or more transmission-reception points.

5. The apparatus of claim 4, wherein the indication that the time-varying co-phasing information for the two or more transmission-reception points can be reported by the UE is provided based at least in part on an identification of a time variation of co-phasing angles associated with the two or more transmission-reception points that exceeds a threshold value.

6. The apparatus of claim 1, wherein the instructions are further executable by the processor to cause the apparatus to:
   receive a request to transmit the measurement report that includes the time-varying co-phasing information, and wherein the measurement report is transmitted responsive to the request.

7. The apparatus of claim 6, wherein the request to transmit the measurement report that includes the time-varying co-phasing information is provided responsive to a loss of phase coherence of the coherent joint communications with the two or more transmission-reception points.

8. The apparatus of claim 1, wherein the time-varying co-phasing information includes separate indications of the time-domain variation of measured phase information for each of the two or more transmission-reception points, or includes a common indication of the time-domain variation of measured phase information that applies to each of the two or more transmission-reception points.

9. The apparatus of claim 1, wherein the time-varying co-phasing information is valid for a time period associated with the coherent joint communications with the two or more transmission-reception points.

10. The apparatus of claim 1, wherein the instructions are further executable by the processor to cause the apparatus to:
transmit a precoding codebook for each of the two or more transmission-reception points that indicates the time-varying co-phasing information associated with each of the two or more transmission-reception points.

11. The apparatus of claim 1, wherein the instructions are further executable by the processor to cause the apparatus to:
transmit a precoding codebook that indicates common time-varying co-phasing information that is common across each transmission-reception point of the two or more transmission-reception points.

12. An apparatus for wireless communication at an access network entity, comprising:
a processor; and
a memory coupled with the processor with instructions stored in the memory, the instructions being executable by the processor to cause the apparatus to:
transmit configuration information for coherent joint communications between a user equipment (UE) and two or more transmission-reception points, the configuration information including an indication that time-varying co-phasing information associated with changes in relative phase information between the two or more transmission-reception points is to be reported by the UE;
receive a measurement report that includes the time-varying co-phasing information based at least in part on a time-domain variation of phase information measured at the UE for each of the two or more transmission-reception points, wherein the time-varying co-phasing information includes a first order variation in a co-phasing angle associated with at least a first transmission-reception point of the two or more transmission-reception points, and wherein a co-phasing angle for the first transmission-reception point for a first slot is based at least in part on a phase angle associated with the first transmission-reception point at a reference slot, the first order variation in the co-phasing angle associated with the first transmission-reception point, and a time difference between the first slot and the reference slot; and
select a precoding matrix for the coherent joint communications based at least in part on the measurement report.

13. The apparatus of claim 12, wherein the instructions are further executable by the processor to cause the apparatus to:
receive an indication that the time-varying co-phasing information for the two or more transmission-reception points can be reported by the UE.

14. The apparatus of claim 13, wherein the indication that the time-varying co-phasing information for the two or more transmission-reception points can be reported by the UE is provided in a capability indication transmitted by the UE.

15. The apparatus of claim 13, wherein the indication that the time-varying co-phasing information for the two or more transmission-reception points can be reported by the UE is provided in an initial measurement report associated with the two or more transmission-reception points.

16. The apparatus of claim 15, wherein the indication that the time-varying co-phasing information for the two or more transmission-reception points can be reported by the UE is provided based at least in part on an identification of a time variation of co-phasing angles associated with the two or more transmission-reception points that exceeds a threshold value.

17. The apparatus of claim 12, wherein the instructions are further executable by the processor to cause the apparatus to:
transmit, to the UE, a request to transmit the measurement report that includes the time-varying co-phasing information, and wherein the measurement report is responsive to the request.

18. The apparatus of claim 17, wherein the request to transmit the measurement report that includes the time-varying co-phasing information is provided responsive to a loss of phase coherence of the coherent joint communications with the two or more transmission-reception points.

19. The apparatus of claim 12, wherein the time-varying co-phasing information includes separate indications of the time-domain variation of measured phase information for each of the two or more transmission-reception points, or includes a common indication of the time-domain variation of measured phase information that applies to each of the two or more transmission-reception points.

20. The apparatus of claim 12, wherein the time-varying co-phasing information is valid for a time period associated with the coherent joint communications between the UE and the two or more transmission-reception points.

21. The apparatus of claim 12, wherein the instructions are further executable by the processor to cause the apparatus to:
receive, from the UE, a precoding codebook for each of the two or more transmission-reception points that indicates the time-varying co-phasing information associated with each of the two or more transmission-reception points.

22. The apparatus of claim 12, wherein the instructions are further executable by the processor to cause the apparatus to:
receive, from the UE, a precoding codebook that indicates common time-varying co-phasing information that is common across each transmission-reception point of the two or more transmission-reception points.

23. A method for wireless communication at a user equipment (UE), comprising:
receiving configuration information for coherent joint communications with two or more transmission-reception points, the configuration information including an indication that time-varying co-phasing information associated with changes in relative phase information between the two or more transmission-reception points is to be reported by the UE; and
transmitting a measurement report that includes the time-varying co-phasing information based at least in part on a time-domain variation of measured phase information associated with each of the two or more transmission-reception points, wherein the time-varying co-phasing information includes a first order variation in a co-phasing angle associated with at least a first transmission-reception point of the two or more transmission-reception points, and wherein a co-phasing angle for the first transmission-reception point for a first slot is based at least in part on a phase angle associated with the first transmission-reception point at a reference slot, the first order variation in the co-phasing angle associated with the first transmission-reception point, and a time difference between the first slot and the reference slot.

24. The method of claim 23, further comprising:

transmitting an indication that the time-varying co-phasing information for the two or more transmission-reception points can be reported by the UE.

25. A method for wireless communication at an access network entity, comprising:

transmitting configuration information for coherent joint communications between a user equipment (UE) and two or more transmission-reception points, the configuration information including an indication that time-varying co-phasing information associated with changes in relative phase information between the two or more transmission-reception points is to be reported by the UE;

receiving a measurement report that includes the time-varying co-phasing information based at least in part on a time-domain variation of phase information measured at the UE for each of the two or more transmission-reception points, wherein the time-varying co-phasing information includes a first order variation in a co-phasing angle associated with at least a first transmission-reception point of the two or more transmission-reception points, and wherein a co-phasing angle for the first transmission-reception point for a first slot is based at least in part on a phase angle associated with the first transmission-reception point at a reference slot, the first order variation in the co-phasing angle associated with the first transmission-reception point, and a time difference between the first slot and the reference slot; and selecting a precoding matrix for the coherent joint communications based at least in part on the measurement report.

26. The method of claim 25, further comprising:

transmitting, to the UE, a request to transmit the measurement report that includes the time-varying co-phasing information, and wherein the measurement report is responsive to the request.

* * * * *